United States Patent [19]

Malott et al.

[11] 4,391,158
[45] Jul. 5, 1983

[54] BIASED TRANSMISSION CONTROL SHAFT

[75] Inventors: Theodore A. Malott; Robert W. Wolfe, both of Jackson, Mich.

[73] Assignee: Clark Equipment Company, Buchanan, Mich.

[21] Appl. No.: 230,781

[22] Filed: Jan. 29, 1981

[51] Int. Cl.³ .......................... G05G 9/12; G05G 5/10
[52] U.S. Cl. ............................... 74/473 R; 74/337.5; 74/477
[58] Field of Search ................. 74/337.5, 473 R, 475, 74/477

[56] References Cited

U.S. PATENT DOCUMENTS 3,857,299 12/1974 Morrison .......................... 74/473 R
4,155,271  5/1979 Wolfe .................................. 74/477
4,170,148 10/1979 Wolfe .................................. 74/337
4,197,760  4/1980 Wolfe .................................. 74/477
4,299,135 11/1981 Gens ............................ 74/473 R X

OTHER PUBLICATIONS

Clark Axle and Transmission Divisions, 390-V Transmission Maintenance and Service Manual—5 Speed, Aug. 1978, Section G.

Primary Examiner—Allan D. Herrmann
Attorney, Agent, or Firm—Mack L. Thomas

[57] ABSTRACT

A manual shift transmission having multiple input and output portions is provided with a control having input and output shift rails. A laterally movable control shaft extends axially through cutouts in respective shift rails and carries cams adapted to cooperate with cam follower surfaces on corresponding cutouts to effect rectilinear movement of the shift rails upon rotation of the control shaft. The cams are arranged on the shaft so that the shaft may be positioned to place respective cams in register with the input and output shift rails while all other cams are out of register with the rail cutouts. The shift movement of respective output and input shift rails is overlapped during the rotation of the control shaft to decrease the throw of the shift lever. The control shaft is spring biased to provide variable resistance in response to movement of a control lever to enable the operator to determine his position in the shift pattern of the transmission.

5 Claims, 59 Drawing Figures

F = FWD.
R = REV.

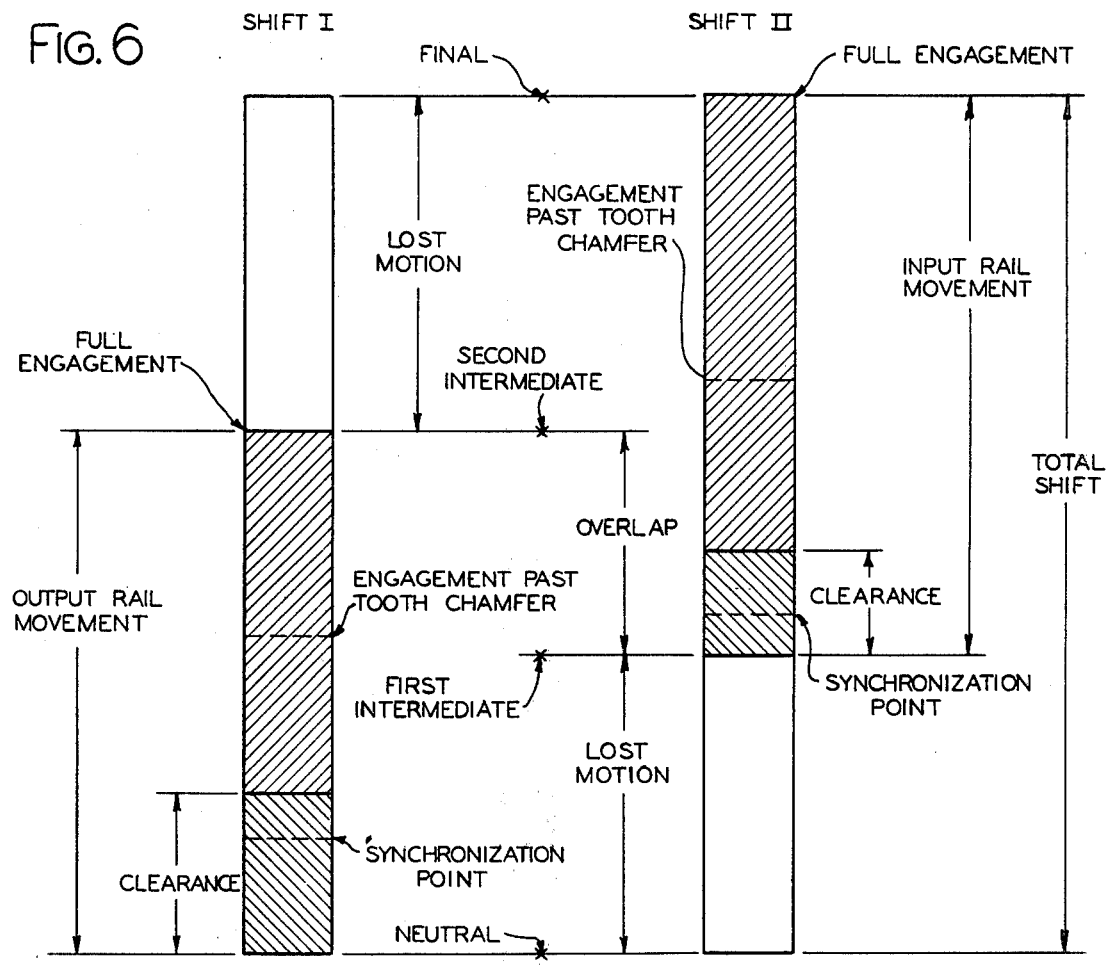
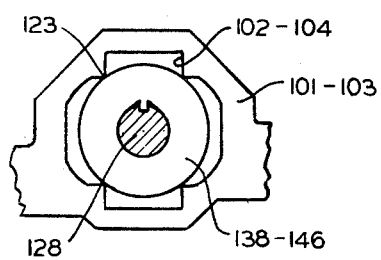
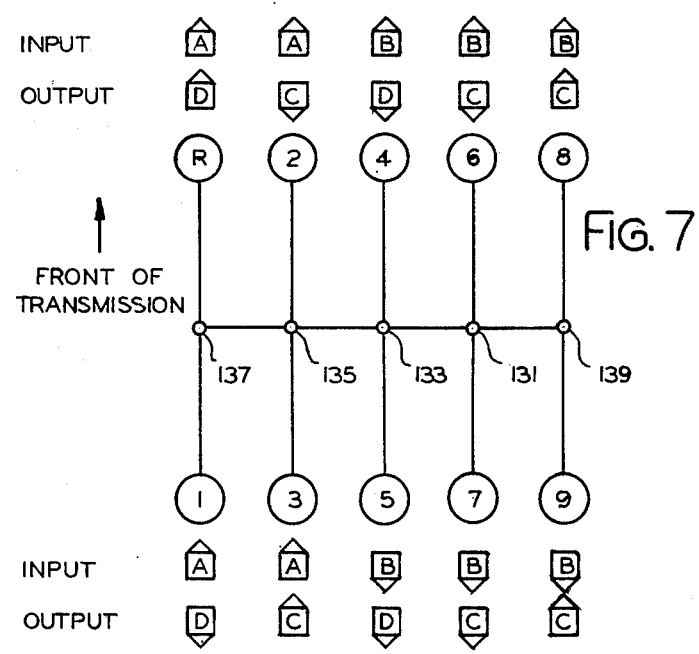

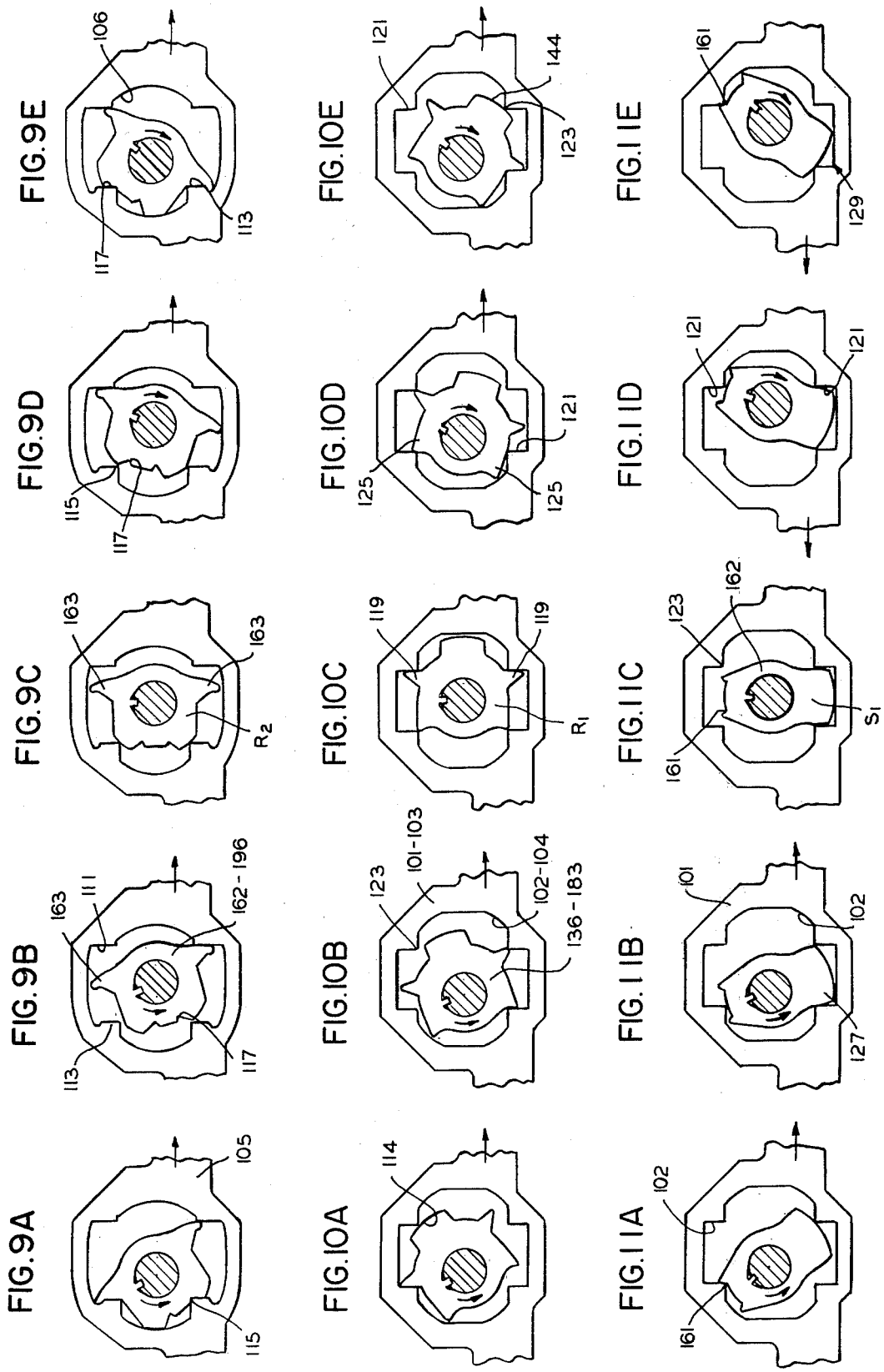

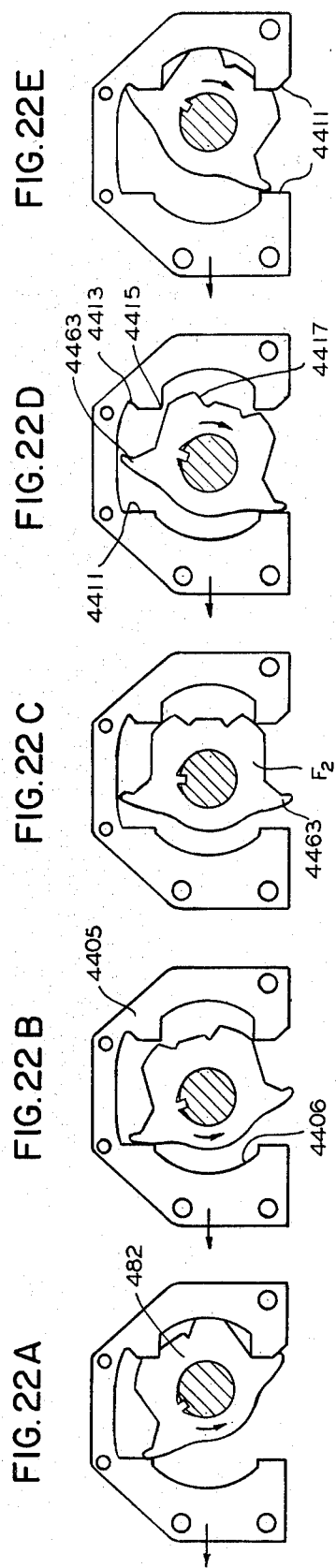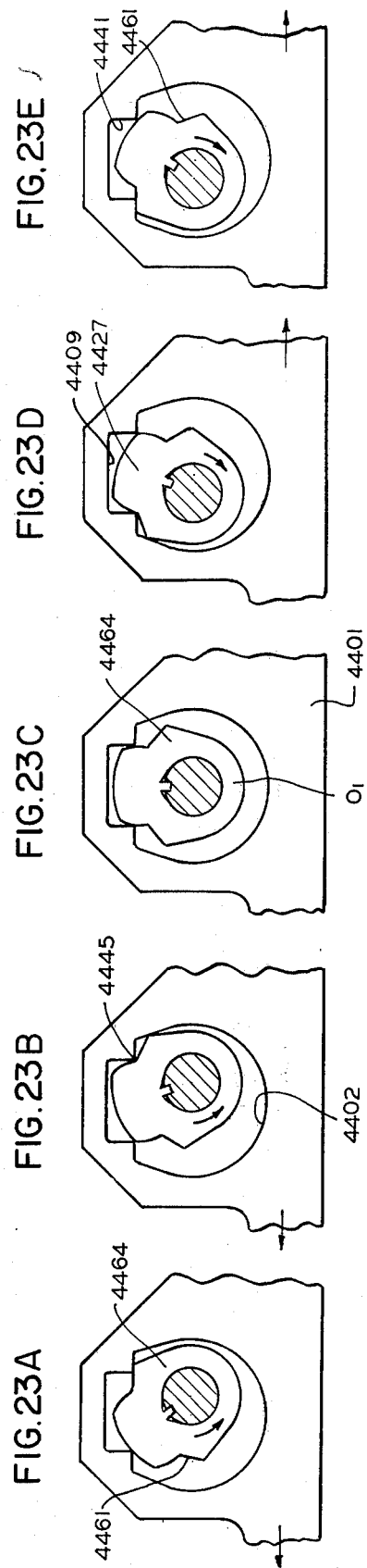

BIASED TRANSMISSION CONTROL SHAFT

CROSS REFERENCES

U.S. patent applications filed simultaneously herewith, one in the names of Barry L. Frost and Theodore A. Malott entitled "Control for Mechanical Transmission", Ser. No. 229,472, filed Jan. 29, 1981, and the other in the name of Theodore A. Malott entitled "Lost Motion Transmission Control Cams", Ser. No. 229,402, filed Jan. 29, 1981, both assigned to the Assignee of the present invention.

BACKGROUND OF THE INVENTION

1. Field of the Invention:

The field of art to which this invention pertains includes shift control systems for multiple input - multiple output transmissions which provide a plurality of speed ratios in response to the movement of an operator's shift lever or the like.

2. Description of the Prior Art:

A manual shift control system is jointly disclosed in U.S. Pat. Nos. 4,155,271, 4,170,148 and 4,197,760, all assigned to the Assignee of the present invention, utilizing input and output control shafts inserted through cutouts in respective input and output shift rails. The control shafts are rotatable in response to shift lever movement.

The control system in the above-cited prior art has an expanded "H" shift pattern to provide for nine forward speed ratios and one reverse speed ratio. One disadvantage to this type of control system is that it is difficult for the operator of the shift lever to always be aware of his position in the shift pattern.

The prior art also includes movable shift forks selectively engageable with the lower end of a shift lever. A plunger assembly is operably associated with the shift fork for resisting movement of the shift fork past a predetermined distance in a selected direction. Although in a five speed forward transmission the plunger assembly performs satisfactorily, it is believed that as the number of speed ratios increase, additional plunger assemblies necessary to provide variable resistance would make the transmission unduly complicated, cumbersome, inefficient and expensive to manufacture. Moreover, the engagement between the lower end of shift lever and the shift fork may not be practical when additional speed ratios are added.

SUMMARY OF THE INVENTION

The present invention solves the previously discussed problems and avoids the disadvantages by providing a transmission control system having a single control shaft carrying a plurality of cams capable of cooperation with associated cam follower cutouts in respective shift rails. The control shaft is rotatable and laterally movable in response to movement of a shift lever. The shift pattern for the control system is an expanded "H" pattern having a standard "H" portion so that the operator of the shift lever encounters increased resistance as he shifts away from the standard "H" pattern. The resistance increases by steps as the operator moves further away in the expanded "H" pattern.

The control shaft is spring biased to the standard "H" portion of the shift pattern. In the first embodiment, the right end of the control shaft is provided with an internal bore that receives a light blockout spring and a collar element which are both slidably mounted in the internal bore with the light blockout spring spaced between the terminal end of the internal bore and the collar element. The collar element is retained in the internal bore by a retaining ring to limit the extent of sliding movement of the collar element. Integrally connected to the collar element is an outwardly extending projection. The light blockout spring is compressed when the projection element encounters a portion of the control cover so that a first amount of resistance is provided to enable the operator to sense when the shift lever is shifted one pair of speed ratios to the right of the standard "H" portion of the shift pattern. Similarly, an internal bore is provided in the left end of the control shaft for receiving identically functioning parts to provide a first amount of resistance when the control shaft is shifted one pair of speed ratios to the left of the standard "H" portion of the control shaft.

Additionally in the first embodiment, a second amount of resistance greater than the first is provided when the control shaft is moved an additional pair of speed ratios to the right of the standard "H" portion of the shift pattern. The second additional amount of resistance is provided by a heavy blockout spring encompassed on the right end of the control shaft and spaced between a wall member relatively fixed on the shaft and a collar member slidably mounted on the shaft. The extent of sliding movement of the collar member is limited by a retaining member operably associated with the control shaft. The second additional amount of resistance is provided when the control shaft moves in a rightward direction so that the collar member also abuts a portion of the control cover to compress the heavy blockout spring.

Further features and advantages of this invention will be more readily understood by persons skilled in the art when following the detailed description in conjunction with the several drawings.

BRIEF DESCRIPTION OF THE DRAWINGS

FIG. 6 is a diagrammatic view of output and input rail movement during a change in speed ratio for the shift control system of the first embodiment;

FIG. 7 is a schematic illustration of a transmission shift pattern for the first embodiment;

FIG. 8 is a detail view of an interlock disc shown operating in a shift rail cutout having a generally cross-like configuration;

FIGS. 9A–E is a detail view illustrating sequential cam movement of a rearward directional $R_2$ cam with initial delay shown operating in a modified cross-like rail cutout;

FIGS. 10A–E is a detail view illustrating sequential cam movement of a rearward directional $R_1$ cam with overtravel shown operating in a FIG. 8 type rail cutout;

FIGS. 11A–E is a detail view illustrating sequential cam movement of a bi-directional $S_1$ cam with overtravel having a downwardly disposed actuator portion shown operating in a FIG. 8 type rail cutout;

FIGS. 22A–E is a detail view illustrating sequential cam movement of an $F_2$ cam with initial delay shown operating in a modified cross-like rail cutout with the lower section deleted; and FIGS. 23A–E illustrates sequential cam movement of an $O_1$ cam with overtravel of a slightly different configuration than that of FIG. 13 having an upwardly disposed actuator portion in a generally circular rail cutout having top cam follower portions.

DESCRIPTION OF THE PREFERRED EMBODIMENTS

The Nine Speed Transmission

Figure 1:
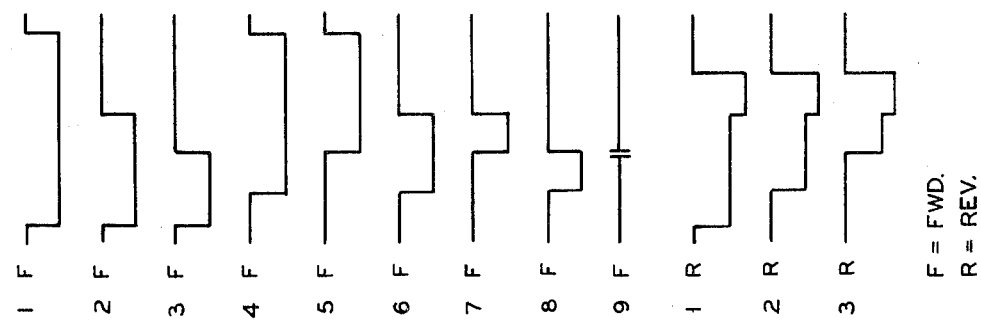
FIG. 1 is a vertical cross-sectional view of a multiple input-multiple output nine speed transmission illustrating the first embodiment of the shift control system of the present invention.

Referring now to the drawings in detail, the specific transmission 28 shown in FIG. 1, which can be used with the transmission control system of this invention, is generally the same as the transmissions shown in prior U.S. Pat. Nos. 4,000,662; 4,155,271; 4,170,148 and 4,197,760, all assigned to the Assignee of this invention. For ease of understanding, however, the structure and function of transmission 28, which has a plurality of constant-mesh change speed gears, is described below.

Transmission 28 includes a casing or housing 32, an input shaft 37 rotatably journalled therein and an output shaft 38 axially aligned with the input shaft and rotatably journalled relative to the input shaft and casing 32. A countershaft 30 is parallel to and vertically displaced below output shaft 38, while a dead shaft 34, parallel to countershaft 30, is fixedly retained in aligned bosses or stub walls 36 in casing 32.

Shaft 37 has a gear 40 affixed thereto or integral therewith, with gear 40 being in constant mesh with gear 42 rotatably journalled on countershaft 30. A conventional dog clutch 44, incorporating a known clutch lock to prevent jumping out of gear and a known synchronizer 45, is disposed on the hub of gear 42 and is arranged either to drivably connect gear 42 to countershaft 30 for conjoint rotation therewith, or to occupy a neutral position as shown in FIG. 1. A typical prior art synchronizer device is disclosed in U.S. Pat. No. 2,667,955, assigned to the assignee of the present invention.

Input shaft tubular portion 33, which is adjacent the inner axial end of gear 40, has either affixed thereto or integral therewith, one end of a sleeve 48 that coaxially surrounds output shaft 38, with sleeve 48 forming an extension of the input shaft.

Rotatably journalled on sleeve 48 is a gear 58 that is in constant mesh with a further gear 60 integral with or affixed to countershaft 30. Rotatably journalled on output shaft 38, adjacent the inner end of sleeve 48, is a gear 64 that is slightly larger in diameter than gear 58 and in constant mesh with a gear 66 integral with or affixed to countershaft 30. Another conventional clutch 68, such as a dog clutch, also incorporating a clutch lock and a known synchronizer 69, is disposed on sleeve 48 between gears 58 and 64 and is arranged either to drivably connect gear 58 to sleeve 48, or to drivably connect gear 64 to sleeve 48, or to occupy a neutral position as shown in FIG. 1. Thus, basically, it is the function of clutch 68 to connect either of gears 58 and 64 for conjoint rotation with input shaft 37 via sleeve 48. Gears 40, 58 and 64, whose pitch circle diameters differ from one another in a well known manner are thus in constant mesh with gears 42, 60 and 66, respectively, with the utilization of clutches 44 and 68 thus providing three separate inputs to countershaft 30. The portion of transmission 28 described so far may be designated the "input" portion of this transmission.

Also journalled for rotation on output shaft 38 are gears 70, 72 and 74 whose pitch circle diameters differ from one another in a well known manner, with gears 70 and 74 being in constant mesh, respectively, with gears 76 and 78 affixed to or integral with countershaft 30. Gear 76, which has a greater axial extent than gear 70, is also in mesh with a gear 82 affixed to or forming part of a tubular reverse-idler shaft 80 which in turn is journalled for rotation on dead shaft 34. Gear 72 is in constant mesh with a gear 84 which is affixed to or forms a part of shaft 80.

A further conventional clutch 88, such as a dog clutch, and also incorporating a clutch lock and a known synchronizer device 90, is disposed on output shaft 38, intermediate gears 64 and 70, and is arranged to drivably connect either of these two gears to shaft 38 or to occupy a neutral position as shown in FIG. 1. A similar conventional clutch 92, incorporating a clutch lock and a known synchronizer 94, is disposed on output shaft 38, intermediate gears 72 and 74, and is arranged to drivably connect either of these gears to shaft 38 or to occupy a neutral position as shown in FIG. 1.

Basically, gears 64, 70, 72 and 74, together with gears 66, 76, 82, 84 and 78, may be described as constituting the "output" portion of transmission 28. It should be noted that gears 64 and 66 can alternately function both as input and output gears, as will be explained in more detail as this description progresses.

Figure 2:
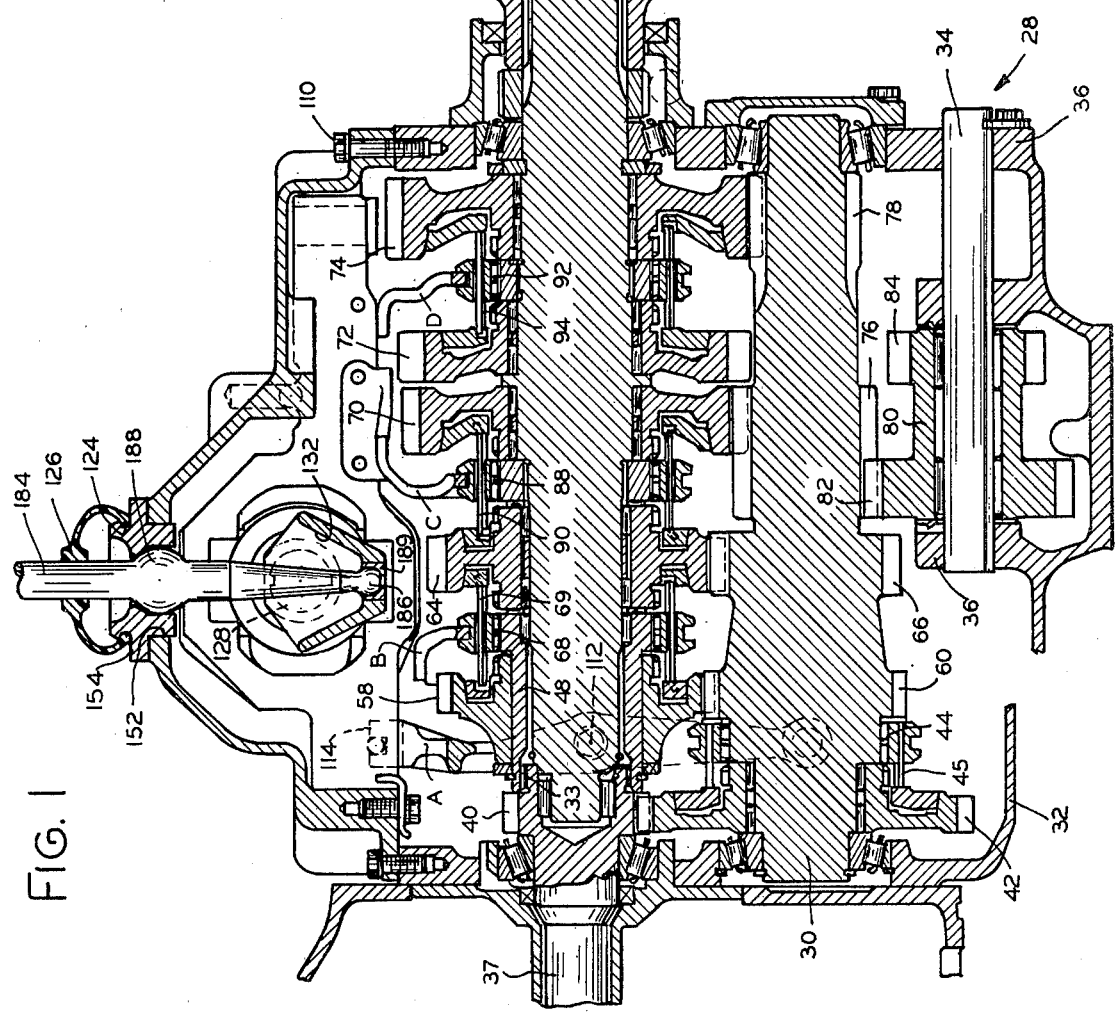
FIG. 2 is a schematic illustration of the power paths through the transmission in each of the possible forward and reverse speeds for the transmission shown in FIG. 1.
Figure 3:
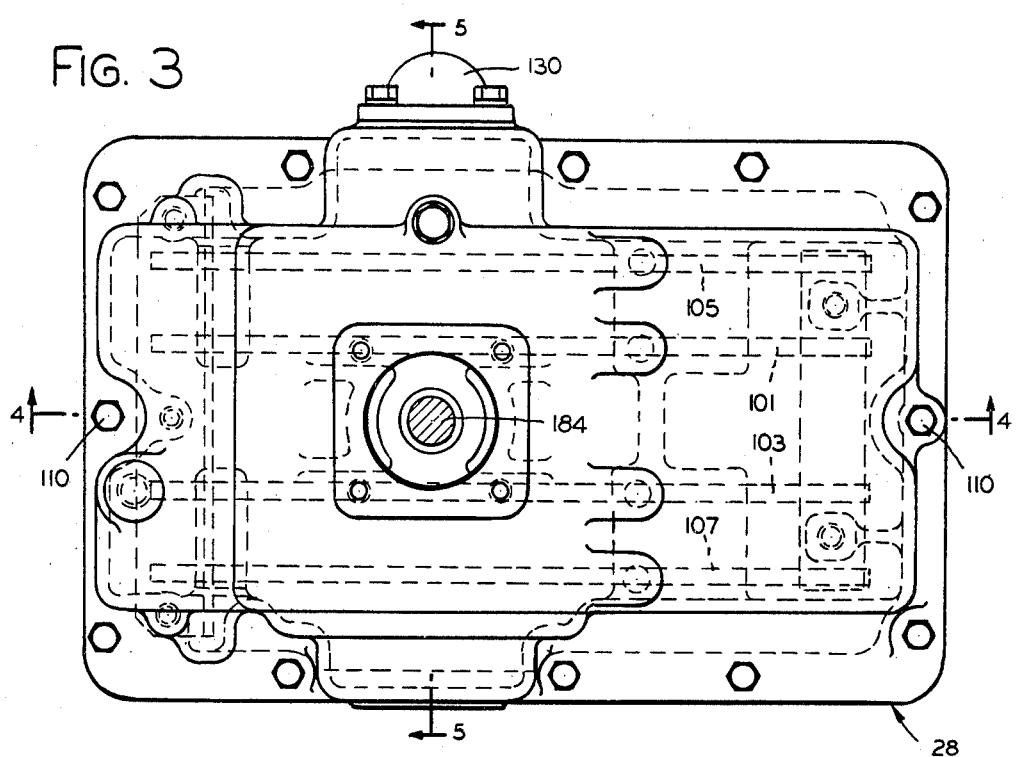
FIG. 3 is a plan view of the transmission shown in FIG. 1 with the shift lever broken away.

In operation, transmission 28 has nine forward speeds and as many as three reverse speeds, although not all of the three reverse speeds need be utilized. For example, only one reverse speed is utilized in the illustrated shift control system of the first embodiment. FIG. 2 is a schematic showing of the various power paths through transmission 28 in each of the possible forward and reverse speeds. As best seen in FIGS. 1 and 2, transmission 28 can be defined as having a first input via constant mesh gears 40 and 42, with the latter being adapted to be coupled to countershaft 30 via clutch 44, with countershaft 30 rotating in a direction opposite to that of input shaft 37. A second input is provided by constantly meshing gears 58 and 60, with the former being adapted to be coupled to input sleeve 48 via the forward (towards the input portion of the transmission) operative position of clutch 68, thereby causing the rotation of countershaft 30 in a direction opposite to that of input shaft 37. Yet another or third input is provided by constantly meshing gears 64 and 66, with the former being adapted to be coupled to input shaft sleeve 48 via the rearward (toward the output portion of the transmission) operative position of clutch 68, thereby rotating countershaft 30 in a direction opposite that of input shaft 37.

A first forward output from transmission 28 can be defined by constantly meshing gears 78 and 74, with the latter being adapted to be coupled to output shaft 38 via the rearward operative position of clutch 92, thereby rotating output shaft 38 in a direction opposite to that of countershaft 30. A second forward output is defined by constantly meshing gears 76 and 70, with the latter being adapted to be coupled to output shaft 38 via the rearward operative position of clutch 88, thereby rotating output shaft 38 in a direction opposite to that of countershaft 30. Yet another or third forward output is defined by constantly meshing gears 66 and 64, with the latter being adapted to be joined to output shaft 38 via the forward operative position of clutch 88, thereby again rotating output shaft 38 in a direction opposite to that of countershaft 30.

A reverse output is provided by constantly meshing gears 84 and 72, with the latter being adapted to be coupled to output shaft 38 via the forward operative position of clutch 92, thereby rotating output shaft 38 in the same direction as countershaft 30 (and in a direction opposite that of input shaft 37).

An analysis of FIG. 2 will show that by utilizing the first input (40,42) together with the first output (78,74) provides a first forward speed. Continuing the use of the first input but utilizing the second (76,70) or third (66,64) outputs will provide second or third forward output speeds. The second input (58,60) together with the first output provides a fourth forward speed, whereas the third input (64,66) with the first output provides a fifth forward speed. The second input together with the second output provides a sixth forward speed whereas the third input together with the second output provides a seventh forward speed. An eighth forward speed is provided by utilizing the second input together with the third output. The third input, which can also be the third output, provides a ninth or direct forward drive by utilizing clutch 68 to couple one side of the hub of gear 64 to input shaft sleeve 48 and by utilizing clutch 88 to couple the other side of the hub of gear 64 to output shaft 38.

Three reverse speeds are available by coupling any of the first, second or third inputs to the reverse output (84,72). In the illustrated example only the first input reverse speed is utilized.

Another way of defining the structure and function of transmission 28 is, as best seen in FIG. 2, that the first input is utilized in the first, second and third speeds as well as the first speed in reverse. The second input is utilized for the fourth, sixth and eighth speeds forward as well as the second speed in reverse. The third input is utilized for the fifth, seventh and ninth speeds forward. The first output is utilized for the first, fourth and fifth speeds forward, whereas the second output is utilized for the second, sixth and seventh speeds forward. The third output is utilized for the third, eighth and ninth speeds forward, while the reverse output is utilized for all of the possible reverse speeds.

Figure 4:
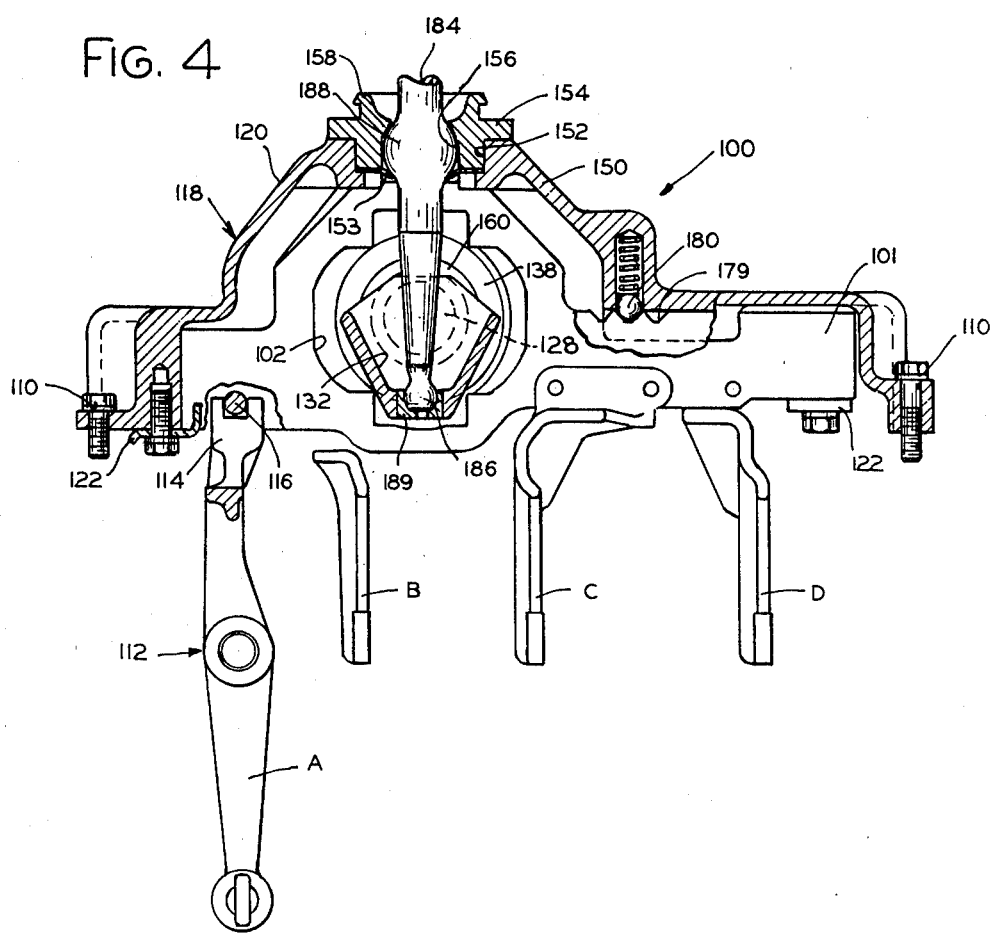
FIG. 4 is a vertical cross-sectional view looking in the direction of arrows 4—4 in FIG. 3 with the shift control system of the FIG. 1 transmission positioned in a neutral position between the fourth and fifth gears.
Figure 5:
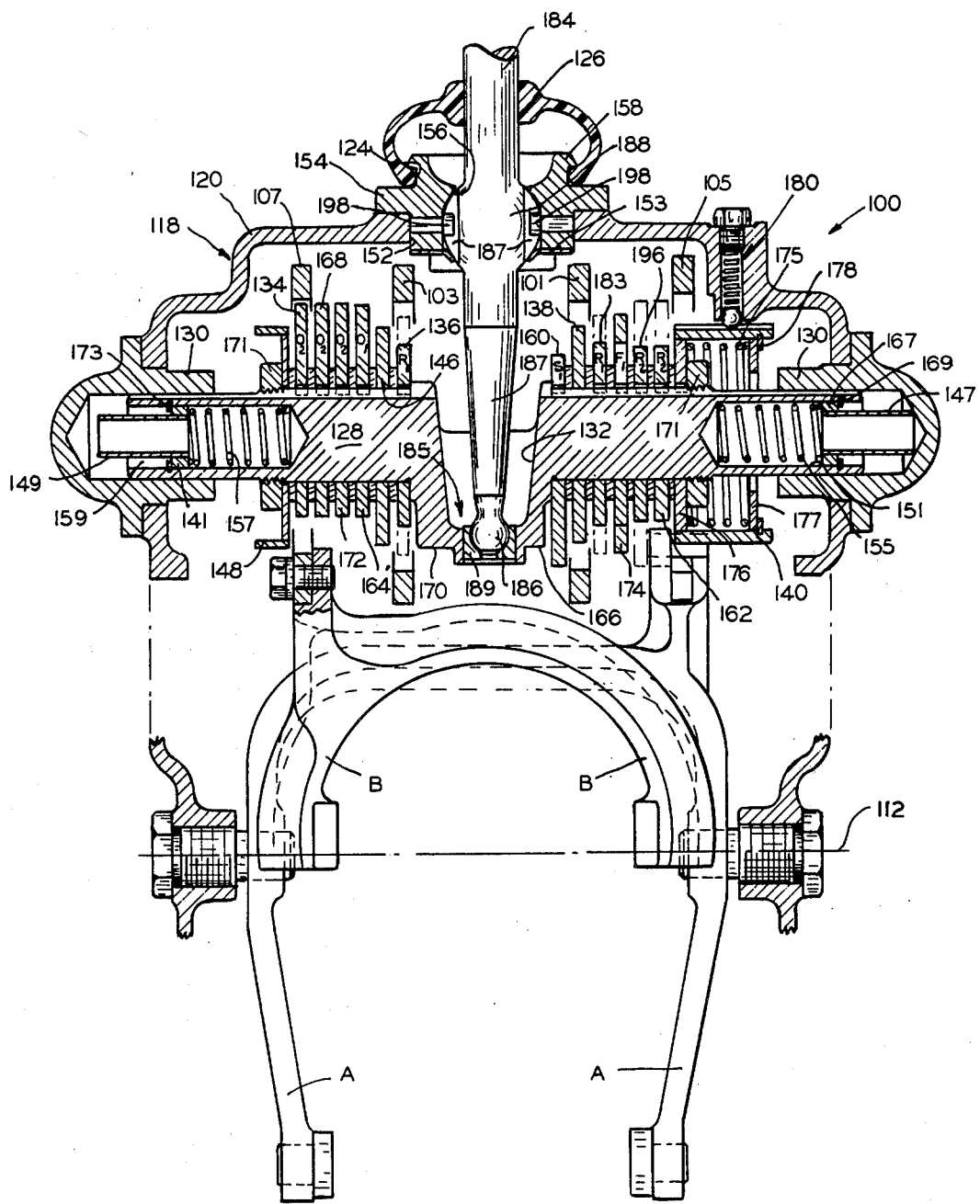
FIG. 5 is an enlarged cross-sectional view looking in the direction of arrows 5—5 in FIG. 3 of the shift control system for the transmission shown in FIG. 1.

A shift control system, generally designated by numeral 100 and best seen in FIGS. 4 and 5, for manually selecting any of the available power paths through the transmission, includes four shift forks or selector elements A, B, C and D. Shift forks B, C and D are rigidly attached to respective shift rails 107, 101 and 103 as will be explained in more detail as this description progresses. Shift fork A (best seen in FIG. 4) is pivotally connected at its midpoint 112 to casing 32 and has a socket portion 114 attached to a lug member 116 which is in turn is rigidly connected with shift rail 105. The lower end of shift fork A operatively engages clutch 44. Shift forks B, C and D operatively engage clutches 92, 88 and 68, respectively.

Shift control system 100 includes a control cover 118 whose control cover housing 120 fits over transmission 28 and is secured to transmission housing 32 by bolts 110. Parallel shift rails 101, 103, 105, and 107 are slidably supported in control over housing 120, for rectilinear movement relative thereto, on support pads 122. Shift rails 101 and 103 which are associated with shift forks C and D, respectively, may be denominated as the output shift rails since they serve to actuate output clutches 88 and 92, respectively. Similarly, shift rails 105 and 107, which are associated with shift forks A and B, respectively, may be denominated as the input shift rails since they serve to actuate input clutches 44 and 68, respectively.

Since clutches 68, 88, and 92 have a neutral position and an operative position on either side of neutral, each one of respective shift rails 107, 101 and 103 is provided with three notches 179 that can cooperate with a respective spring loaded detent 180 in order to position the respective shift rails to any one of these positions. See shift rail 101 illustrated in FIG. 4. Shift rail 105 is provided with only two notches 179 since clutch 44 has one operative position in addition to its neutral position.

Output shift rail 101 has a centrally located cutout 102 having a generally cross-like configuration which is symmetrical about its vertical and horizontal center lines. An identical cutout 104 is provided in output shift rail 103. See FIGS. 10, 11, 13 and 14. In FIG. 9 input shift rail 105 has a centrally located cutout 106 having a modified cross-like configuration symmetrical about its horizontal center line but not its vertical center line, see FIG. 12. Shift rail 107 has a circular cutout 108 having a top cam follower portion 109, which will be discussed in detail below.

Control cover housing 120 is provided with a top cover portion 150 having a general circular opening 152. Inserted in the opening 152 is a cap member 154 having a partial spherical opening 156 that is adapted to receive the mounting ball 188 of a shift lever 184. The mounting ball 188 is supported by a Belleville spring 153. A pair of spaced apart opposed pins 198 project into the opening 156 in cap member 154 and are received in respective slots 187 of mounting ball 188 to provide shift lever pivotal movement in the conventional manner. The cap member 154 has an outwardly flared flange 158 to receive the peripheral edge 124 of a closure member 126 which engages the shift lever 184 above the top cover portion 150. Closure member 126 is preferably made of a resilient material that will accommodate movement of the shift lever 184 and acts as a lubricant seal.

A control shaft 128 is rotatably journalled in control cover 120 and retained in spaced apart opposed bearing caps 130 that are attached to or integral with control cover 120, best shown in FIG. 5.

The control shaft 128 is provided with a centrally located cup shaped recess 132 which receives a lower shift lever assembly portion 185 of shift lever 184. The shift lever assembly portion includes a lower shift lever ball 186 received in a nylon annular bearing 189. The provision of the nylon annular bearing which abuts the outer surface of the cup shaped recess 132 reduces friction and vibration transmitted to the shift lever from the control shaft. Optionally, control cover housing 120 could also be of nylon construction to reduce noise and vibration.

With reference to FIG. 7, upward or forward movement of the handle of shift lever 184 will cause the control shaft 128 to rotate in a counterclockwise direction as viewed in FIGS. 8-14 through a predetermined arc, and downward longitudinal movement will cause the control shaft 128 to rotate in a clockwise direction through another predetermined arc. Additionally, lateral movement of the handle (not shown) of the shift lever in a leftward direction as viewed in FIG. 5 will cause the control shaft 128 to move axially to the right and rightward movement of the shift lever handle will cause the control shaft to move axially to the left.

A cylindrical projection 147 having an inner collar member 167 is internally mounted in a recessed bore 151 in the right outer end of control shaft 128. The collar portion 167 is prevented from escaping the bore 151 by a retaining ring 169 mounted in an annular groove in the bore 151. The projection 147 is urged outwardly by a light blockout spring 155. Similarly, a cylindrical projection 149 is mounted in a recessed bore 159 in the left outer end of control shaft 128 and has a collar portion 141 retained in the bore 159 by a retaining ring 173 mounted in a groove in the bore 159. The projection 149 is urged outwardly by a light blockout spring 157 sandwiched between collar portion 141 and the inner end of bore 159.

A relatively wide interlocking member 140 mounted on the right end of control shaft 128 is a hollow cylinder having a heavy blockout spring 175 mounted therein sandwiched beween the interior surface of left side wall 176 of interlocking member 140 and a collar member 177 slidably mounted around the control shaft 128 which is retained in the interior of hollow interlocking member 140 by a retaining ring 178 mounted in a groove in the interior surface of interlocking member 140.

In FIG. 5 the control shaft 128 is in a neutral position between 4th and 5th speed ratios (neutral position 133 as viewed in FIG. 7) so that right projection 147 is in slight contact with the interior surface of bearing cap 130. When the handle of the shift lever 184 is moved to its neutral position between the 6th and 7th speed ratios (neutral position 131 as viewed in FIG. 7) the control shaft 128 shifts to the left as viewed in FIG. 5 so that the outer end of cylindrical projection 149 is in slight contact with the interior surface of left bearing cap 130. Accordingly the fourth through seventh speeds may be considered to form the standard "H" pattern of the transmission. To move the shift lever 184 to a neutral position between the 8th and 9th speed ratios (neutral position 139 as viewed in FIG. 7) the handle (not shown) of the control lever 184 is moved to the right as viewed in FIG. 7 so that the control shaft 128 as viewed in FIG. 5 moves to the left so that light blockout spring 157 is compressed. The neutral position between the 8th and 9th speed ratios is reached when the light blockout spring 157 is fully compressed. To place the transmission 28 in the 2nd or 3rd speed ratios the handle of the shift lever 184 is moved to a neutral position between the 2nd and 3rd speed ratios (neutral position 135 as viewed in FIG. 7) so that the control shaft is moved to the right as viewed in FIG. 5 so that light blockout spring 151 is further compressed from its FIG. 5 position and heavy blockout spring 175 is not compressed further than its FIG. 5 position. The transmission 28 is in a neutral position between the first and reverse gears (neutral position 137 as viewed in FIG. 7) when extreme leftward movement of the shift lever handle as viewed in FIG. 7 occurs and in this condition both light blockout spring 151 and heavy blockout spring 175 are fully compressed. The varying resistance in the positioning of the handle of the shift lever 184 enables the operator to determine his position in the shift pattern in the expanded "H" shift pattern shown in FIG. 7.

The control shaft 128 is contained in the cutouts 106, 108, 102 and 104 in the shift rails and carries a plurality of cam members which selectively engage corresponding cam follower surfaces in the respective cutouts to axially shift the respective rails when a camming member undergoes rotation in a cutout due to longitudinal movement of the shift lever 184. Each cam is keyed on the control shaft in the usual fashion and the cams are held in place on the control shaft by a respective nut 171 threaded on either end of the outer surface of control shaft 128.

In FIG. 6 the input and output shift rail movement during a change in speed ratios is diagrammatically illustrated. Also shown in FIG. 6 are the neutral, first intermediate, second intermediate and final rotative positions of the control shaft 128 which correspond to the initial position of both shift rails, the beginning of input shift rail movement, the termination of output shift rail movement and the termination of input shift rail movement, respectively.

In the shift I portion of the FIG. 6 diagram the selected cam associated with the output shift rail cutout (further discussed below) is positioned in cutout 102 or 104 of respective output shift rail 101 or 103 for engagement with the cam follower surface of the cutout to shift the output shift rail in a chosen direction. Output shift rail movement controls the engagement of the corresponding output clutch in the conventional manner. Initial output shift rail movement causes the elimination of the clearances between the elements of the synchronizer and the conventional chamfered clutch teeth in the clutch in a known fashion. Further illustrated output rail movement operates the selected clutch to place the selected gears in driving engagement. The points of engagement past clutch teeth chamfers and full clutch engagement are shown in FIG. 6. The output rail does not undergo substantial movement during the latter portions of the control shaft 128 rotation since the cam positioned in the output rail cutout undergoes lost motion; i.e., its cam surfaces are not engaged with the cam follower surfaces of the cutout during latter portions of rotation of control shaft 128.

In the shift II portion of the FIG. 6 diagram the movement for an input shift rail such as input shift rail 105 or 107 is illustrated. The selected cam associated with input shift rail cutout (further discussed below) is positioned in the cutout of the selected input shift rail and undergoes lost motion during the first portions of rotation of control shaft 128. After a delay the first engagement between the cam positioned in the selected input shift rail and the camming surfaces of the input shift rail cutout actuates the corresponding input clutch which operates in the identical sequence as the output clutch discussed above. The latter portions of the output shift rail movement overlap with the initial portions of the input shift rail movement. The overlap occurs while the selected output clutch teeth are engaged at the point past the tooth chamfers to full engagement, while input shift rail movement is causing the elimination of the clearances between the synchronizer elements and the input clutching teeth.

With further reference to FIG. 7, the selected output and input shift rail is identified for each speed ratio. The arrows indicate the direction of movement of the lower portion of each respective fork A, B, C, D and associated clutch 44, 92, 88 and 68. Since forks B, C and D are connected rigidly to their respective shift rails 107, 101 and 103 they move in the same direction as their shift rails. Shift fork A is pivotally connected to shift rail 105, hence the upper portion of fork A moves in a direction opposite to its shift rail. The arrangement of cams on the control shaft 128 is determined by the desired shift lever pattern, such as that shown in FIG. 7 and the design of the transmission used therewith.

The two basic types of cam members mounted on the control shaft are double oscillating motion-single linear motion cams (unidirectional cams) and double oscillating motion-double linear motion cams (bidirectional cams). All cam members are adapted to cooperate with their associated shift rails to effect shift rail movement when the shaft 128 and cam members thereon are rotated from a neutral rotative position to a final rotative position. The unidirectional cams used in the present transmission 28 are denominated F cams and R cams. F cams are unidirectional cams which shift a corresponding shift rail in a forward direction towards the input portions of the transmission regardless of the direction of shaft rotation. Similarly R cams are unidirectional cams which shift the corresponding shift rail in a direction toward the rearward output portions of the transmission.

The subnumeral "1" found in $F_1$ and $R_1$ cams indicates initial shift cams with overtravel, i.e., cams undergoing lost motion during the latter portions of the rotation of control shaft 128. The subnumeral "2" found for example in $R_2$ cams indicates a cam with a delayed shift.

Each of the cams have return portions for returning the associated shift rail from its shifted position back to its original position. The return portions of each subnumeral "1" cam are of the delayed shift type, while the turn portions of each of the subnumeral "2" cams are of the initial shift with overtravel type. It should be noted that all subnumeral "1" cams are output cams in the illustrated first embodiment while all subnumeral "2" cams are input cams. Therefore the selected output shift rail is shifted before the input shift rail when going from a neutral position to a speed ratio while the selected input shift rail is returned before the selected output shift rail when going from a speed ratio to a neutral position.

S cams are cams that shift the corresponding shift rail in the same direction as the lower shift lever ball 186 during shift lever movement. O cams shift corresponding shift rails in the opposite direction of the lower ball 186 during shift lever movement.

From the above description, it can be noted that the letter and subnumber of each cam will identify the type of cam (unidirectional or bidirectional) and the manner in which shift rail movement is accomplished.

FIGS. 8-14 illustrate the cam member-shift rail cutout interaction taking place during speed ratio changes in transmission 28. As an aid to understanding the invention, the different types of cam members in operation with associated cutouts of selected shift rails illustrated in FIGS. 8-14 will be discussed in detail below.

FIG. 8 illustrates a circular interlock disc member 138 positioned in the cutout 102 of input shift rail 101. The interlock member 138 during rotation of shaft 128 prevents the aligned shift rail 101 from being displaced since the outer peripheral surface of interlock member 138 is in abutment with outer corner portions 123 of the cam follower surface of the respective cutout. Similarly, interlock member 146 may be positioned in cutout 104 of output shift rail 103. Interlock members appear also in FIG. 5. As illustrated in FIG. 5 control shaft 128 also includes similar wide interlocking cylindrical members 140 and 148 disposed on opposite ends of control shaft 128 which are receivable in selected cutouts and operate in identical fashion as the interlock member 138 discussed above. In addition, interlocking surfaces 166 and 170 respectively, are machined on the control shaft 128 on either side of cup shaped recess 132 and also serve to lock associated shift rails during a speed ratio change in transmission 28.

FIGS. 9A-E illustrates an $R_2$ cam operating in cutout 106 of shift rail 105. FIG. 9C illustrates the position of the $R_2$ cam when the control shaft 128 is in its neutral position. The $R_2$ cam has top and bottom tooth portions 163 which are inclined away from right end wall portions 111 of cutout 106 when the control shaft 128 and $R_2$ cam mounted thereon is in its neutral FIG. 9C position. The clockwise movement of the $R_2$ cam from a FIG. 9C to a FIG. 9E position is accomplished by moving the handle of the shift lever in a downward longitudinal direction as shown in FIG. 7. Under clockwise rotation of the control shaft 128, the top tooth portion 163 comes in contact with top end wall 111 of the cutout cam follower surface as shown in FIG. 9D and further clockwise rotation of control shaft 128 will cause rail 105 to move in a rearward direction which because of the intervening lever moves clutch 44 forwardly. In FIG. 9E the control shaft has been rotated until the backside of lower tooth portion 163 abuts tooth locking portion 113 of the cam follower surface of cutout 106 and an upper corner portion 115 of the cam follower surface of cutout 106 is received in an upper notch return portion 117 of the $R_2$ cam. In the FIG. 9E position the control shaft is prevented from further clockwise rotational movement which is sensed by the operator manipulating shift lever 184 to indicate that the shift is completed. To change speed ratios the $R_2$ cam is rotated counterclockwise from the FIG. 9E position so that the upper notch return portion 117 in abutment with the upper corner portion 115 of cam follower surface of the cutout 106 will shift the shift rail 105 towards the forward input direction of the transmission 28 to return the shift rail to its FIG. 9D position then overtravel to return the control shaft to its FIG. 9C position. At this point the control shaft can be axially repositioned or further upward longitudinal movement of the shift lever 184 as shown in FIG. 7 will effect additional counterclockwise rotation of control shaft 128 to cause the lower tooth portion 163 of the $R_2$ cam to be placed in abutment with the lower end wall 111 of the cam follower surface of cutout 106 and further counterclockwise rotation of control shaft 128 will cause shift rail 105 to shift in a rearward direction until the $R_2$ cam is in the FIG. 9A position wherein the backside of upper tooth 163 is received in upper locking portion 113 of the outer cam follower surface at cutout 106 and lower corner portion 115 is received in lower notch return portion 117 of the $R_2$ cam. This moves rail 105 in a rearward output direction to move clutch 44 forwardly the same as previously described for cam movement between FIG. 9C and FIG. 9E. Then downward movement of the shift lever 184 to a neutral position of the shift lever as shown in FIG. 7 will cause the $R_2$ cam to shift the shift rail 105 back to its neutral 9C position from its 9A position due to contact between notch return portion 117 and locking surface 113.

In FIGS. 10A–E an $R_1$ cam operates in a cutout 102 or 104 to shift the shift rail 101 or 103 in a rearward output direction. The $R_1$ cam has upper and lower tooth portions 119 adjacent to upper and lower right end wall portions 121 of the cam follower surface of cutout 102 when the control shaft 128 is in its neutral position as shown in FIG. 10C. Movement of the shift lever 184 in a downward direction as viewed in FIG. 7 will cause the control shaft 128 to rotate in a clockwise direction so that the $R_1$ cam shifts the shift rail 101 in a rearward output direction until the cam-rail contact is disengaged due to the tip of the upper tooth 119 clearing the end wall 121 of the outer cam follower surface of cutout 102 as shown in FIG. 10D. Further lost motion clockwise rotation of the control shaft 128 will result in the $R_1$ cam being positioned in the 10E position wherein middle locking portion 144 of the $R_1$ cam is in contact with the right lower corner portion 123 of the outer cam follower surface of cutout 102 and the backside of lower tooth portion 119 is in contact with lower left end wall 121. To return the shift rail 101 or 103 to its neutral position, the control shaft is rotated in a counterclockwise direction wherein a trailing upper edge return portion 125 after an initial lost motion delay will come in contact with left upper end wall 121 to shift the shift rail 101 or 103 in a forward input direction until both the shift rail and the control shaft are returned to their FIG. 10C position. At this point the control shaft can either be axially repositioned or continued upward longitudinal movement of the control lever 184 as viewed in FIG. 7 will cause the control shaft 128 to continue to rotate in a counterclockwise direction such that lower tooth portion 119 adjacent to right lower end wall 121 will move the shift rail 101 or 103 in a rearward output direction until the tip of the lower tooth portion 119 passes by the right lower corner 123 of cutout 102 or 104. The operator of the shift lever 184 can feel that the shift is completed when the backside of the upper tooth 119 is in contact with left upper end wall 121 and the locking portion 144 is in contact with the right upper corner portion 123 of cutout 101 or 103. To return the $R_1$ cam from its FIG. 10A position to its FIG. 10C position, lower trailing edge return portion 125 after initial lost motion delay will come in contact with left lower end wall 121 to shift the shift rail 101 or 103 forward to its FIG. 10C neutral position.

In FIG. 11A–E an $S_1$ cam is positioned in cutout 102 of shift rail 101. The $S_1$ cam has a wide actuator portion 127 receivable in the bottom cross portion 129 of the outer cam follower surface of cutout 102. The neutral position for the $S_1$ cam is shown in FIG. 11C so that the $S_1$ cam is vertically disposed and the outer surfaces of the actuator portion 127 are adjacent to respective lower end walls 121 forming the lower cross portion 129. Clockwise rotation of control shaft 128 will cause the left edge of actuator portion 127 to press against the lower left end wall 121 of cutout 102 to cause the shift rail 101 to move in a forward input direction until the actuator portion 127 clears the lower left outer corner 123 of cutout 102 as shown in FIG. 11D. Further clockwise lost motion rotation will place the $S_1$ cam in FIG. 11E position where the $S_1$ cam is locked from further rotation since an upper left stop portion 161 is in contact with right upper corner portion 123 of cutout 102 and the central portion of the lower edge of actuator portion 127 is in contact with the left lower corner 123 of cutout 102. To return the output shift rail 101 to its neutral FIG. 11C position, the $S_1$ cam is rotated in a counterclockwise position so that the right stop portion 161 of actuator portion 127 becomes a return portion and after an initial post motion delay is in contact with lower right end wall 121 to shift the shift rail 101 or 103 in a rearward direction to return it to its FIG. 11C position. Continued counterclockwise rotation of the control shaft 128 and the $S_1$ cam mounted thereon will move the shift rail 101 or 103 from its FIG. 11C neutral position in a rearward output position until the $S_1$ cam is in the position shown in FIG. 11B so that the leading right edge of actuator portion 127 of the $S_1$ cam clears the lower right corner 123 of the cutout 102 or 104. Further lost motion rotation of the $S_1$ cam in a counterclockwise position will cause rightward locking portion 161 of the $S_1$ cam to contact the upper left corner 123 of cutout 102. Return of the $S_1$ cam from the FIG. 11A position to the FIG. 11C neutral position is simply the reverse of the above-described process.

In FIGS. 12A–E an $O_2$ cam is positioned in the cutout 108 of the shift rail 107. When the $O_2$ cam is in its neutral FIG. 12C position a single tooth portion 190 of the $O_2$ cam is spaced from the end walls 143 of a top cam follower surface 109 of cutout 108. Under clockwise rotation of control shaft 128 the $O_2$ cam moves from its FIG. 12C neutral position to its FIG. 12D position wherein initial contact is made between the tooth portion 190 and right end wall 143. Further clockwise rotation of control shaft 128 shifts the shift rail 107 in a rearward output direction until left locking notch-return portion 142 on the $O_2$ cam is in contact with the left corner surface 145 of top cam follower surface 109.

Figure 12E:
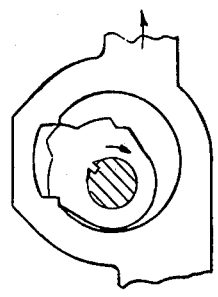
FIGS. 12A–E is a detail view illustrating sequential cam movement of a bi-directional $O_2$ cam with initial delay having an upwardly disposed actuator portion shown operating in a generally circular rail cutout having top cam follower portions.
Figure 12D:
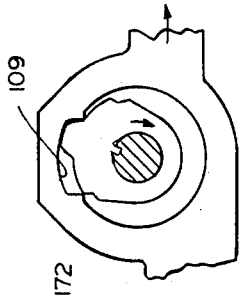
Figure 12C:
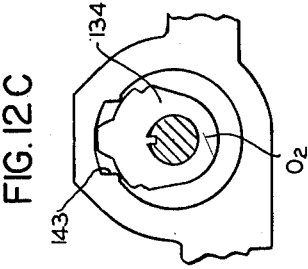
Figure 12B:
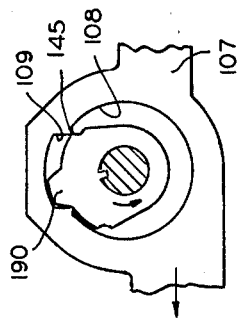
Figure 12A:
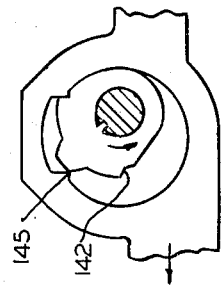

Counterclockwise rotation of control shaft 128 and the $O_2$ cam mounted thereon from the FIG. 12E position forwardly shifts the input shift rail 107 by the left locking notch-return portion 142 pressing against left corner 145 of cutout 108 until the notch clears the left corner 145 as shown in FIG. 12D. Further lost motion counterclockwise rotation of the $O_2$ cam returns it to the FIG. 12C position, where the control shaft 128 may be axially repositioned or rotated further in a counterclockwise direction so that tooth portion 190 abuts left end wall 143. Further counterclockwise rotation of the $O_2$ cam in cutout 108 from the FIG. 12B position to the FIG. 12A position effects the forward shifting of input shift rail 107. The shift is completed when right locking notch-return portion 142 contacts the right corner 145 of the cam follower surface 109.

The $O_1$ cam of FIGS. 13A–E is identical to the $S_1$ cam of FIGS. 11A–E except that the position of the actuator portion 127 is vertically reversed in the shift rail 101 or 103 and operates in the top cross portion 129. Clockwise rotation of the control shaft 128 now effects rearward movement of the shift rail 101 or 103 and counterclockwise rotation of the control shaft effects forward movement of the shift rail 101 or 103. Otherwise the operation of the $O_1$ cam of FIGS. 13A–E is identical to the operation of the $S_1$ cam in FIGS. 11A–E and like reference numerals are utilized for identical parts.

An $F_1$ cam is positioned in cutout 102 or 104 of rail 101 or 103 as shown in FIGS. 14A–E. The $F_1$ cam is a horizontally reversed $R_1$ cam of FIGS. 10A–E and its upper tooth portion 119 shifts the shift rail 101 or 103 in a forward input direction upon rotation of control shaft 128 in either a clockwise or counterclockwise direction. The reference numerals used in FIG. 10 to identify the $R_1$ cam are also repeated in FIG. 14 for identical parts. Otherwise the operation and function of the $F_1$ cam is identical to that of the $R_1$ cam.

Operation of Nine Speed Transmission

In FIG. 5 the control shaft 128 is in a neutral position between the fourth and fifth speed ratios so that an $O_2$ cam 134 is positioned in the cutout 108 of input shift rail 107 and a $R_1$ cam 136 is positioned in the cutout 104 of output shift rail 103. Additionally, interlock member 138 is positioned in cutout 102 of output shift rail 101 and relatively wide cylindrical interlocking member 140 is in cutout 106 of input shift rail 105. When the handle of shift lever 184 is moved upwardly to its FIG. 7 fourth speed ratio position, the control shaft 128 is rocked or rotated in a counterclockwise direction so that $R_1$ cam 136 rotates from its neutral FIG. 10C position through its FIG. 10B position to its FIG. 10A position so that output shift rail 103 and fork D are shifted in a rearward direction to actuate clutch 92 to place gears 74 and 78 in operation to provide the fourth speed ratio output. Additionally, $O_2$ cam 134 rotates from its neutral FIG. 12C position through its FIG. 12B position to its FIG. 12A position so that input shift rail 107 and fork B are shifted in a forward direction to actuate clutch 68 to place gears 58 and 60 in operation to provide the fourth speed ratio input. To change speed ratios, the handle of the shift lever 184 is returned to its neutral position 133 shown in FIG. 7 between the fourth and fifth speed ratios causing these selected shift rails and forks to return to their corresponding neutral positions.

To place the transmission 28 in its fifth speed ratio, the shift lever handle is moved from its neutral position 133 downwardly to its indicated fifth speed ratio position shown in FIG. 7. The $R_1$ cam 136 rotates from its FIG. 10C position through its FIG. 10D position to its FIG. 10E position so that output shift rail 103 and fork D are moved in a rearward direction to actuate clutch 92 to place gears 74 and 78 in mating engagement to provide the fifth speed ratio output. Additionally, $O_2$ cam 134 rotates from its neutral FIG. 12C position through its FIG. 12D position to its FIG. 12E position to shift both the output shift rail 101 and fork B in a rearward direction to actuate clutch 68 to place gears 64 and 66 in operation to provide the fifth speed ratio input.

As viewed in FIG. 7 to shift the transmission 28 from the neutral position 133 between the fourth and fifth speed ratios to a neutral position 135 between the second and third speed ratios, the shift lever handle is pivoted to the left so that the control shaft 128 moves one cam to the right as viewed in FIG. 5 to place $S_1$ cam 160 in the cutout 102 of output shift rail 101 and $R_2$ cam 162 in the cutout 106 of input shift rail 105. When the shift lever handle is in the neutral position 135, wide interlocking member 148 is in the cutout 108 of input shift rail 107 and interlock disc 146 is in cutout 104 of output shift rail 103.

When the shift lever handle is moved upwardly to its FIG. 7 second speed ratio position, the control shaft 128 rotates in a counterclockwise direction causing $S_1$ cam 160 to rotate from its neutral FIG. 11C position through its FIG. 11B to its FIG. 11A position so that output shift rail 101 and fork C are shifted in a rearward direction to actuate clutch 88 to place gears 76 and 70 in operation to provide the second speed output in the second speed ratio. Additionally, $R_2$ cam 162 rotates from its neutral FIG. 9C position through its FIG. 9B position to its FIG. 9A position so that input shift rail 105 is shifted in a rearward direction. However, due to the conventional pivotable connection of fork A to the housing 32 at the midpoint 112 of fork A, the lower end of fork A is shifted in a forward direction to actuate clutch 44 to place gears 40 and 42 in operation to provide the second speed ratio input. To change speed ratios, the shift lever handle is returned to its neutral position 135 causing the selected shift rails and forks to return to their corresponding neutral positions.

As viewed in FIG. 7, to place the transmission 28 in its third speed ratio, the handle of the shift lever 184 is moved from its neutral position 135 downwardly to its indicated third speed ratio position. The $S_1$ cam 160 rotates from its FIG. 11C position through its FIG. 11B position to its FIG. 11A position so that output shift rail 101 and fork C are moved in a forward direction to actuate clutch 88 to place gears 64 and 66 in operation to provide the third speed ratio output. Additionally, $R_2$ cam 162 rotates from its neutral FIG. 9C position through its FIG. 9B position to its FIG. 9A position to shift input shift rail 105 and fork A to actuate clutch 44 to place gears 40 and 42 in operation to provide the third speed ratio input.

As shown in FIG. 7, to place the transmission 28 in first or reverse speed ratios, the handle of the shift lever 184 is positioned at neutral position 137 so that the control shaft 128 is shifted two cams to the right as viewed in FIG. 5 to position $R_2$ cam 196 in cutout 106 of input shift rail 105 and $O_1$ cam 164 in cutout 104 of output shift rail 103. Additionally, relatively wide interlocking member 148 is still positioned in cutout 108 of input shift rail 107 and interlocking surface 166 is positioned in output shift rail 101.

Figure 13E:
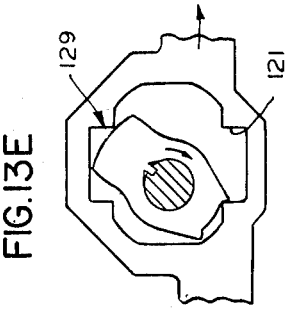
FIGS. 13A–E is a detail view illustrating sequential cam movement of a bi-directional $O_1$ cam with overtravel having an upwardly disposed actuator portion shown operating in a FIG. 8 type rail cutout.
Figure 13D:
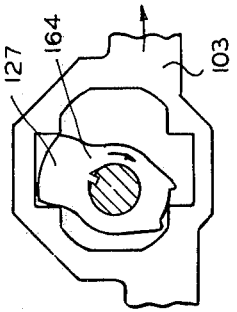
Figure 13C:
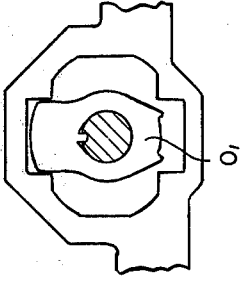
Figure 13B:
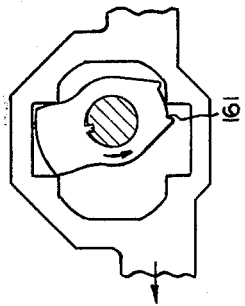
Figure 13A:
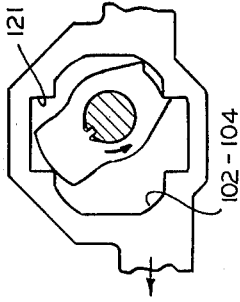

When the handle of the shift lever 184 is moved upwardly to its reverse speed ratio position as shown in FIG. 7, the control shaft 128 is rotated in a counterclockwise direction so that $O_1$ cam 164 rotates from its neutral FIG. 13C position through its FIG. 13B position to its FIG. 13A position so that output shift rail 103 and fork D are shifted in a forward direction to actuate clutch 92 to place gears 72 and 84 in operation to provide the reverse speed ratio output. Additionally, $R_2$ cam 196 operates in an identical fashion as $R_2$ cam 162 as described in the description of the second speed ratio. To change speed ratios, the handle of the shift lever 184 is returned to its neutral position 137 between the reverse and first speed ratios.

As shown in FIG. 7, to place the transmission 28 in its first speed ratio, the handle of the shift lever 184 is moved from its neutral position 137 downwardly to its indicated first speed ratio position. The $O_1$ cam 164 rotates from its neutral FIG. 13C position through its FIG. 13D position to its FIG. 13E position so that output shift rail 103 and fork D are shifted in a rearward direction to actuate clutch 92 to place gears 74 and 78 in operation to provide the first speed ratio output. Additionally, $R_2$ cam 196 operates in identical fashion as $R_2$ cam 162 as described in the third speed ratio input to provide the first speed ratio input.

As shown in FIG. 7, to place the transmission 28 in its sixth or seventh speed ratios, the handle of shift lever 184 is moved to the neutral position 131 to shift the control shaft 128 one cam position to the left of that shown in FIG. 5 so that $R_1$ 183 is positioned in cutout 102 of output shift rail 101 and $O_2$ cam 168 is positioned in cutout 108 of input shift rail 107. Additionally, interlocking surface 170 is positioned in cutout 104 of output shift rail 103 and relatively wide interlocking member 140 is positioned in cutout 106 of input shift rail 105.

When the handle of shift lever 184 is moved upwardly to its FIG. 7, sixth speed ratio position, the control shaft 128 and $R_1$ cam 183 mounted thereon rotates in a counterclockwise direction to rearwardly shift output shift rail 101 and fork C to actuate clutch 88 to place gears 70 and 76 in operation to provide the sixth speed ratio output. $R_1$ cam 183 functioning in the identical manner as $R_1$ cam 136 in cutout 104 of output shift rail 103 operates in the fourth speed ratio output described above. Additionally, $O_2$ cam 168 in cutout 108 of shift rail 107 provides the sixth speed ratio input in an identical fashion as $O_2$ cam 134 as described in the description of the fourth speed ratio input discussed above.

To place the transmission 28 in its seventh speed ratio, the handle of the shift lever 184 is moved from its neutral position 137 downwardly to its indicated seventh speed ratio position. $R_1$ cam 183 in cutout 102 of output shift rail 101 provides the seventh speed ratio output to actuate clutch 88 to place gears 70 and 76 in operation in an identical fashion as discussed above for the sixth speed ratio. Additionally, $O_2$ cam 168 in cutout 108 of input shift rail 107 operates in an identical fashion as $O_2$ cam 134 in cutout 108 of input shift rail 107 in the fifth speed ratio input as discussed above.

As shown in FIG. 7, to place the transmission 28 in the eighth or ninth speed ratios, the handle of the gear shift selector 184 is moved to the neutral position 139 so that the control shaft 128 is moved two cams to the left as shown in FIG. 5 so that $O_2$ cam 172 is positioned in cutout 108 of input shift rail 107 and $F_1$ cam 174 is positioned in cutout 102 of output shift rail 101. Additionally, locking surface 170 of control shaft 128 is positioned in cutout 104 of output shift rail 103 and relatively wide interlocking member 140 is positioned in cutout 106 of input shift rail 105.

Figure 14E:
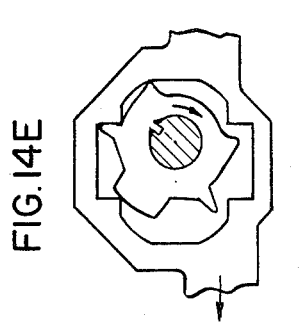
FIGS. 14A–E is a detail view illustrating sequential cam movement of a forward directional $F_1$ cam with overtravel shown operating in a FIG. 8 type cutout.
Figure 14D:
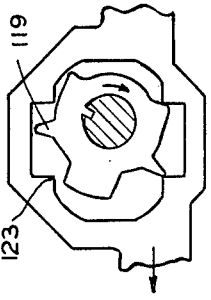
Figure 14C:
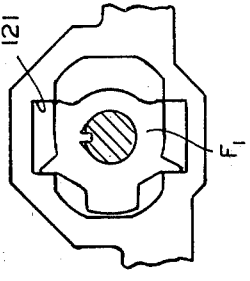
Figure 14B:
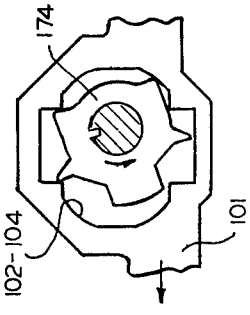
Figure 14A:
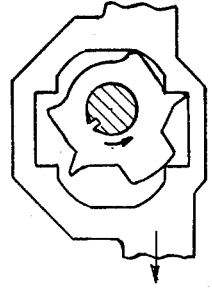

When the handle of the shift lever 184 is moved upwardly to its FIG. 7 eighth speed ratio position, the control shaft 128 rotates in a counterclockwise direction so that $F_1$ cam 174 mounted thereon moves from its neutral FIG. 14C position through its FIG. 14B position to its FIG. 14A position so that output shift rail 101 and fork C are shifted in a forward direction to actuate clutch 88 to place gears 64 and 66 in operation. Additionally, $O_2$ cam 172 operates to provide the eighth speed input in an identical fashion as the fourth speed ratio input is provided by $O_2$ cam 134 discussed above.

To place the transmission 28 in its ninth speed ratio, the handle of the shift lever 184 is moved from its neutral position 139 downwardly to its indicated ninth speed ratio position shown in FIG. 7. The $F_1$ cam 162 rotates from its FIG. 14C position through its FIG. 14D position to its FIG. 14E position so that output shift rail 101 and fork C are shifted to actuate clutch 88 in a forward direction. Additionally, the $O_2$ cam 172 operates in the same fashion as described above for $O_2$ cam 134 in the description of the fifth speed ratio input to actuate clutch 68 in the rearward output direction. The effect of these operations is to lock the input and output shafts together for direct drive, through sleeve 48, clutch 68, gear 64 and clutch 88.

To summarize, the selected cams and interlocks are positioned in the cutouts of the respective shift rails to provide the speed ratios as follows:

| Speed Ratio | Input Shift Rail 105 | Input Shift Rail 107 | Output Shift Rail 101 | Output Shift Rail 103 |
|---|---|---|---|---|
| R-1 | $R_2$ Cam 196 | Wide Interlocking Member 148 | Interlocking Surface 166 | $O_1$ Cam 164 |
| 2-3 | $R_2$ Cam 162 | Wide Interlocking Member 148 | $S_1$ Cam 160 | Interlocking Member 146 |
| 4-5 | Wide Interlocking Member 140 | $O_2$ Cam 134 | Interlocking Member 138 | $R_1$ Cam 136 |
| 6-7 | Wide Interlocking Member 140 | $O_2$ Cam 168 | $R_1$ Cam 183 | Interlocking Surface 170 |
| 8-9 | Wide Interlocking Member 140 | $O_2$ Cam 172 | $F_1$ Cam 174 | Interlocking Surface 170 |

The Seven Speed Transmission

Figure 15:
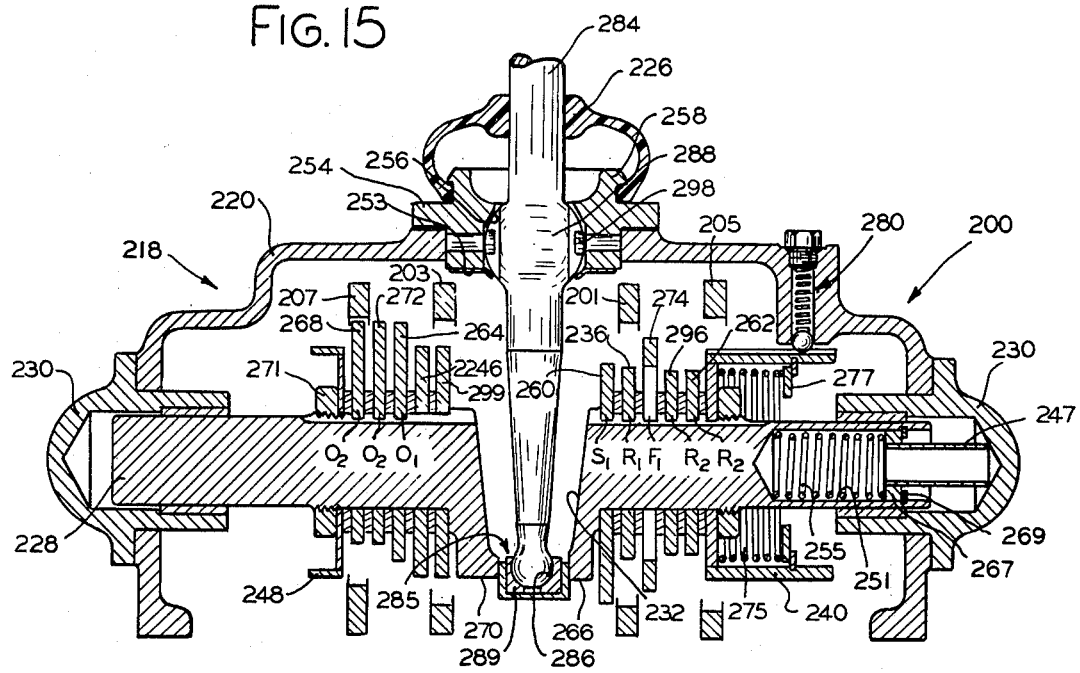
FIG. 15 is a cross-sectional view similar to FIG. 5 of a second embodiment of the present invention for a shift control system for a seven speed transmission.
Figure 16:
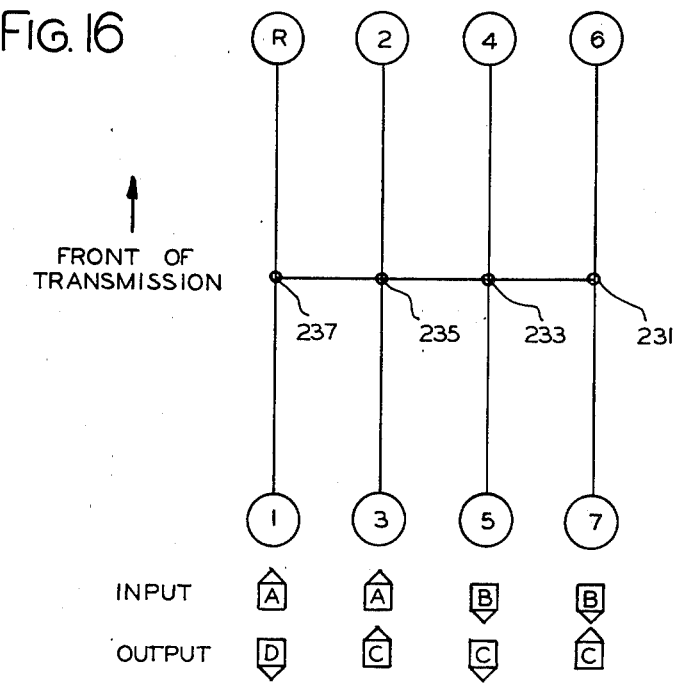
FIG. 16 is a schematic drawing similar to FIG. 7 illustrating the shift pattern for a seven speed transmission shift control system of FIG. 15.

Referring now to FIGS. 15 and 16, a second embodiment of the present invention is illustrated and is essentially identical to the first embodiment of FIGS. 1-14 except that the fourth and fifth speed ratio are eliminated so that a seven speed transmission is provided. Like components are denoted by the same reference numerals as in FIGS. 1-14 except that 100 series numerals are expressed as 200 series numerals.

The modifications to transmission 28 shown in FIG. 1 necessary to accommodate the control system 200 shown in FIG. 15 are not set forth in detail since such modifications would be obvious to one skilled in the art.

In the control system shown in FIG. 15, $O_2$ cam 134 and interlock member 138 used in the fourth and fifth speed ratios in the first embodiment are eliminated. An additional interlocking member 2246 is mounted on the control shaft 228 adjacent the leftward portion of cup-shaped recess 232 and operates in the cutout of shift rail 203 when the control shaft 228 is positioned in the second or third speed ratios or the neutral position 235 between the second and third speed ratios as viewed in FIG. 16.

The direction of movement of the lower portion of each selected fork is shown in FIG. 16. It should be noted that the reverse through third speed ratios shown in FIG. 16 are identical to that shown in FIG. 7 while the fourth through seventh speed ratios in FIG. 16 are identical to the sixth through ninth speed ratios shown in FIG. 7.

The recessed bore 159 of control shaft 128 and the parts mounted therein shown in FIG. 5 of the first embodiment are eliminated in the second embodiment since the elimination of the fourth and fifth speed ratios of the first embodiment renders light blockout spring 157 unnecessary.

The Six Speed Transmission

Figure 17:
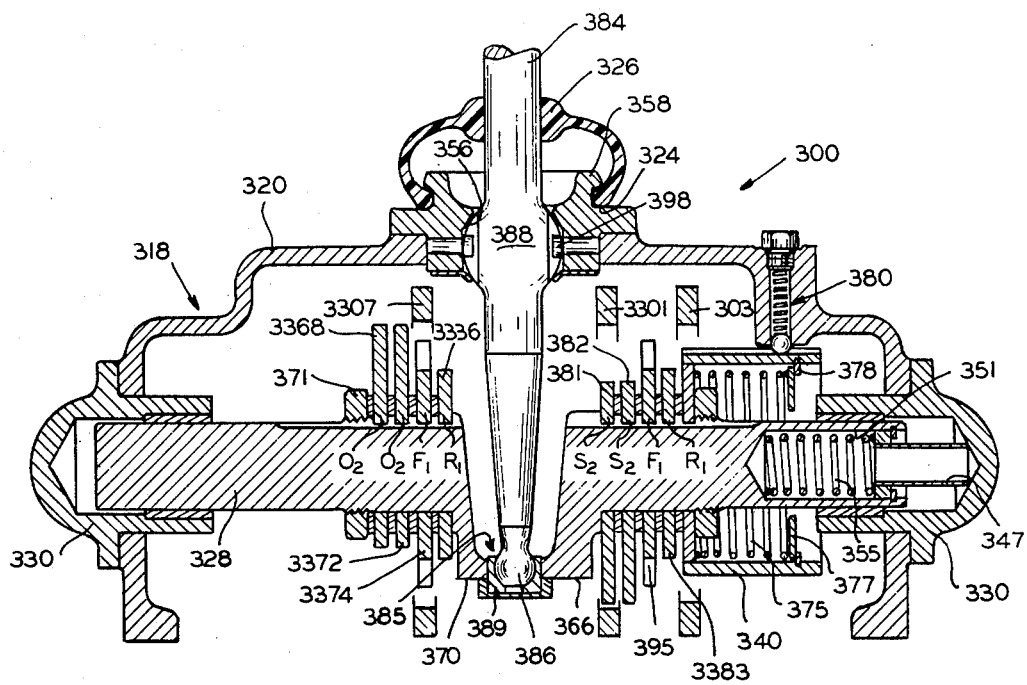
FIG. 17 is a cross-sectional view similar to FIG. 5 of a shift control system of a third embodiment of the present transmission for a six speed transmission.
Figure 18:
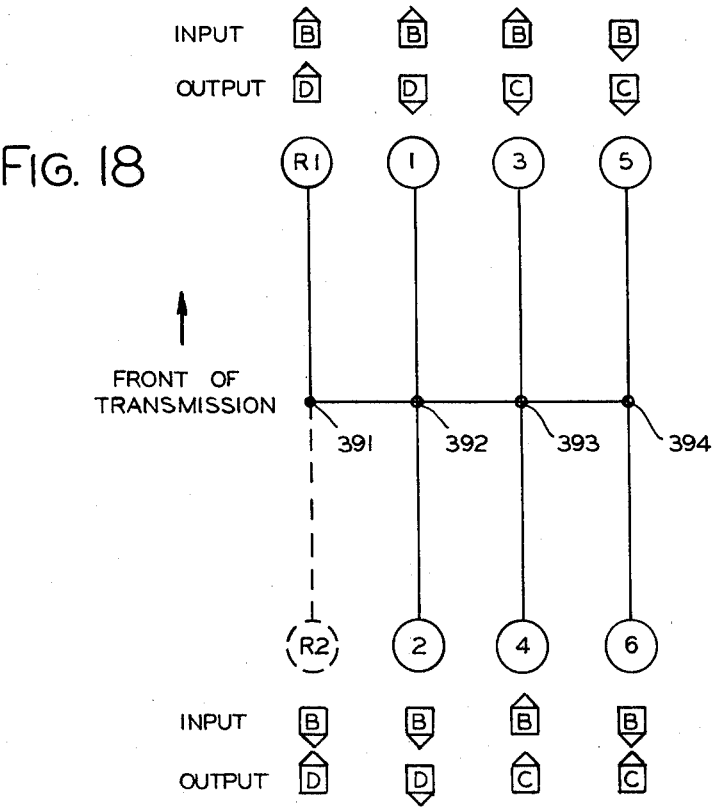
FIG. 18 is a schematic drawing similar to FIG. 7 illustrating the shift pattern for a six speed transmission shift control system of FIG. 17.

Referring now to FIGS. 17–19, a third embodiment of the present transmission is shown and is similar to the first embodiment of the control system except as discussed below. Accordingly, like components are denoted as in FIGS. 1–14 except that they are expressed in 300 series notation.

In the third embodiment a transmission control system 300 for a six speed transmission is disclosed that has two reverse speeds, R1 and R2 (optional). A multiple input-multiple output transmission for the control system of the third embodiment is not illustrated but a known conventional transmission could easily be adapted to cooperate with this transmission control system.

The transmission control system 300 includes output shift rails 3301 and 303 and input shift rail 3307. Forks B, C, and D are associated with the respective shift rails as in the first embodiment. It should be noted that pivotally mounted fork A is not included in the third embodiment so all the forks move in the same direction as their respective rails as illustrated in FIG. 18. The cutout for rail 3301 has a bottom cam follower portion 3309 similar to the cutout 108 of shift rail 107 in the first embodiment. The input rail 3307 has a cutout similar to cutout 102 or 104 of output shift rails 101 or 103 of the first embodiment. The cutout for the output shift rail 303 is identical to cutout 104 of output shift rail 103 of the first embodiment.

$S_2$ cams 381–382 are utilized in this embodiment as illustrated in FIG. 19. $S_2$ cam 381 is positioned in cutout 3302 of shift rail 3301 during the third and fourth speed ratios and $S_2$ cam 382 during the fifth and sixth speed ratios. The cutout 3302 has a bottom cam follower portion 3309 capable of receiving tooth portion 3390 of each $S_2$ cam.

Figure 19A:
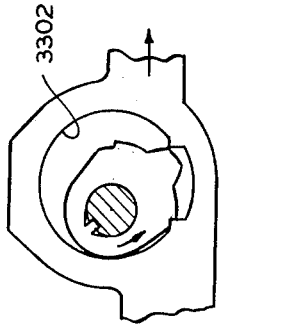
FIGS. 19A–E is a detail view illustrating sequential cam movement of a bi-directional $S_2$ cam with initial delay having a downwardly disposed actuator portion and shown operating in a generally circular rail cutout having bottom cam follower portions.
Figure 19B:
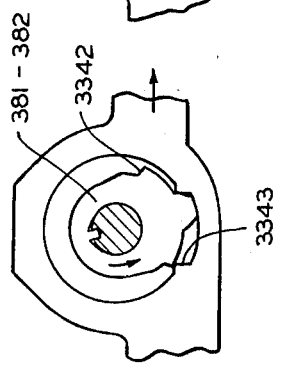
Figure 19C:
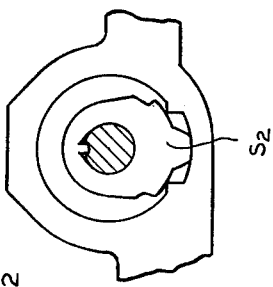

In its neutral FIG. 19C position, the actuator portion 3390 of the $S_2$ cam positioned in the cutout 3302 is spaced from the end walls 3343 of the cam follower surface on the cutout 3302. Under clockwise rotation of control shaft 328, each $S_2$ cam moves from its neutral FIG. 12C position to its FIG. 12D position wherein initial contact is made between the actuator portion 3390 and left end wall 3343. Further clockwise rotation of the control shaft 328 shifts the shift rail 3301 in a forward input direction until right locking notch-return portion 3342 on cam $O_2$ is in contact with the right corner surface 3345 of lower cam follower surface 3309.

Figure 19D:
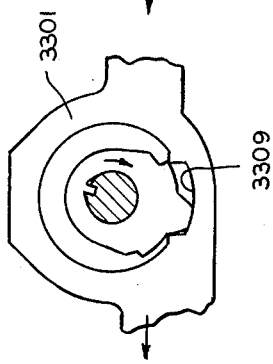
Figure 19E:
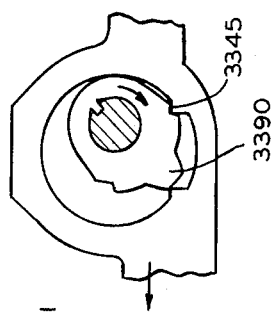
Figure 20:
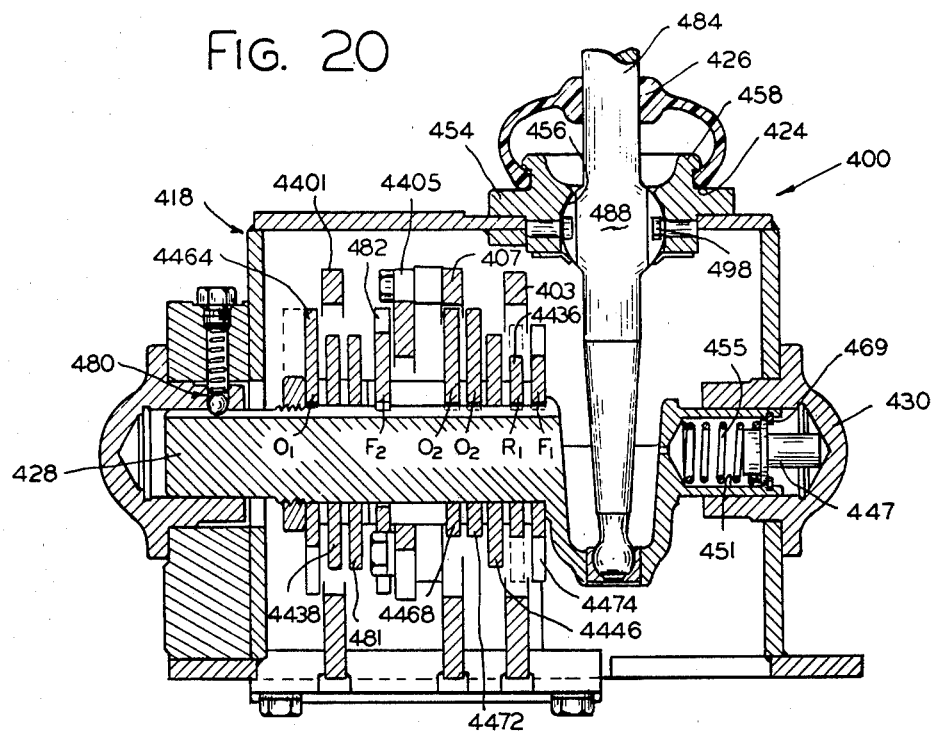
FIG. 20 is a cross-sectional view similar to FIG. 5 of a fourth embodiment of the present invention for a shift control system for a five speed transmission.

Counterclockwise rotation of control shaft 328 and the $S_2$ cam mounted thereon from the FIG. 19E position forwardly shifts the output shift rail 3301 by means of the left locking notch-return portion 3342 pressing against left corner 3345 of cutout 3302 until the notch clears the left corner 3345 as shown in FIG. 19D. Further lost motion counterclockwise rotation of the $S_2$ cam returns it to the FIG. 19C position where the control shaft 328 may be axially repositioned or rotated further in a counterclockwise rotation so that actuator portion 3390 abuts right end wall 3343. Further clockwise rotation of the $S_2$ cam in the cutout 3302 from the FIG. 19B position to the FIG. 19A position effects the rearward shifting of output shift rail 3301. The shift is completed when the left locking notch-return portion 3342 contacts the left corner 3345 of the cam follower surface 3309.

In the R1, R2, first and second speed ratios, the output rail is shifted before the input rail as was done in the first and second embodiments. However, in the third through sixth speed ratios the input rail is shifted before the output rail. This demonstrates that the transmission control system of the present invention is flexible and can be modified to conform with transmissions of various configurations.

The shift control system 300 operates essentially as the control system 100. In FIG. 18 the shift pattern of the shift control system of FIG. 17 is illustrated. Neutral position 393 between the third and fourth speed ratios corresponds with the position of the control shaft 328 in FIG. 17. When the handle (not shown) of shift lever 384 is shifted to the right as viewed in FIG. 18 to the neutral position 394 between the fifth and sixth speed ratios, the control shaft moves one cam to the left as viewed in FIG. 17. Similarly when the handle of the shift lever is moved to the neutral position 392 between the first and second speed ratios, the control shaft 328 moves one cam to the right and moves yet another cam to the right when the shift lever is moved to neutral position 391 between the R1 and R2 speed ratios.

The third through sixth speeds may be considered to comprise the standard "H" portion of the shift pattern shown in FIG. 18. The right end of control shaft 328 is provided with a bore 351 that receives light blockout spring 355 and associated parts. A heavy blockout spring 375 and associated parts is received in the interior of interlock member 340 to enable the operator to distinguish the additional speed ratios in an identical fashion as the two pairs of leftward adjacent speed ratios are distinguished in the first embodiment.

Except as noted all cams function as previously discussed with respect to the first embodiment. However, the shift rails are repositioned in the transmission and the cams are rearranged on the control shaft 328 to present the third embodiment six speed shift control system of the present invention. The selected cams are positioned in the cutouts of respective shift rails to provide the speed ratios as follows:

| Speed Ratio | Input Shift Rail 3307 | Output Shift Rail 3301 | Output Shift Rail 303 |
|---|---|---|---|
| R1–R2 | $O_2$ Cam 3368 | Locking Surface 366 | $F_1$ Cam 395 |

-continued

| Speed Ratio | Input Shift Rail 3307 | Output Shift Rail 3301 | Output Shift Rail 303 |
| --- | --- | --- | --- |
| 1-2 | $O_2$ Cam 3372 | Locking Surface 366 | $R_1$ Cam 3383 |
| 3-4 | $F_1$ Cam 3374 | $S_2$ Cam 381 | Wide Interlocking Member 340 |
| 5-6 | $R_1$ Cam 3336 | $S_2$ Cam 382 | Wide Interlocking Member 340 |

The Five Speed Transmission

Referring now to FIGS. 20-23, a fourth embodiment of the present invention is illustrated and is similar to the first embodiment of the control system except as otherwise discussed below. Accordingly, like components are denoted as in FIGS. 1-14 except that they are expressed in 400 Series notation.

In the fourth embodiment a transmission control system 400 for a five forward speed transmission is disclosed that has one reverse speed. A multiple input-multiple output transmission for the control system of the fourth embodiment is not illustrated but known conventional transmissions could easily be adapted to cooperate with this transmission control system.

The transmission control system 400 includes output shift rails 4401 and 403 and input shift rail 407 having an auxiliary rail 4405 rigidly attached thereto so that the auxiliary rail 4405 and input shift rail 407 move in unison when a selected cam rotates in the cutout of input shift rail 407 or the cutout of auxiliary rail 4405. It should be noted that the cams are positioned on the control shaft 428 so that a cam is not simultaneously positioned in the cutouts of input shift rail 407 and auxiliary rail 4405 during any of the speed ratios shown in FIG. 21. The cutout for input shift rail 407 is similar to the cutout 108 of rail 107 shown in the first embodiment. The cutout 4406 for auxiliary rail 4405 is a modified version of the cutout 106 of shift rail 105 in that the cutout is vertically reversed and the bottom portion is eliminated. The output shift rail 4401 has a generally circular cutout 4402 having a top cam follower portion 4409 as shown in FIG. 23.

Figure 21:
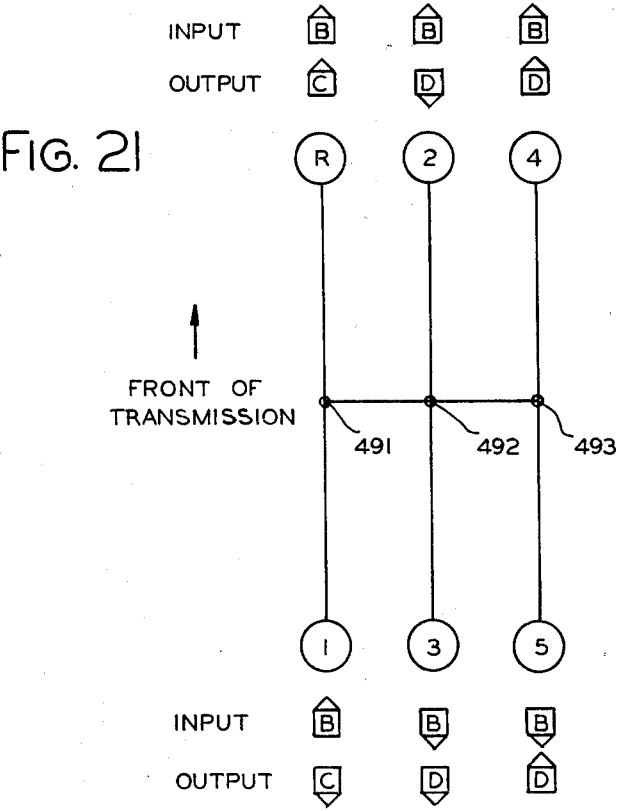
FIG. 21 is a schematic drawing similar to FIG. 7 illustrating the shift pattern for a five speed transmission shift control system of FIG. 20.

FIGS. 22A-E illustrates an $F_2$ cam utilized in this embodiment operating in cutout 4406 of auxiliary rail 4405. FIG. 22C illustrates the position of the $F_2$ cam when the control shaft 428 is in its neutral position. The $F_2$ cam has top and bottom tooth portions 4463 which are inclined away from left end wall portions 4411 of cutout 4405 when the control shaft 428 and the $F_2$ cam mounted thereon is in its neutral FIG. 22C position. The movement of the $F_2$ cam from its FIG. 22C position to a FIG. 22E position is accomplished by moving the handle of the shift lever in a downward longitudinal direction as shown in FIG. 21 to cause clockwise rotation of the control shaft 428. Under clockwise rotation of the control shaft 428, the bottom tooth portion 4463 comes into contact with the bottom end wall 4411 of the cutout cam follower surface as shown in FIG. 22D and further clockwise rotation of the control shaft 428 will cause the auxiliary rail 4405 and shift rail 4407 connected thereto to move in a forward input direction. In FIG. 22E the control shaft has been rotated until the backside of upper tooth portion 4463 abuts tooth locking portion 4413 of the cutout 4406 and lower corner portion 4415 of the cam follower surface of the cutout 4406 is received in a lower notch-return portion 4417.

To change speed ratios the $F_2$ cam is rotated counterclockwise from the FIG. 22E position so that the lower notch-return portion 4417 in abutment with the lower corner portion 4415 of the cam follower surface of the cutout 4406 will axially shift the auxiliary rail 4405 towards the rearward output direction of the transmission to return the auxiliary rail 4405 to its FIG. 22C neutral position, thus also returning the shift rail 407 to its neutral position.

At this point the control shaft could be axially repositioned or further upward longitudinal movement of the shift lever 484 as shown in FIG. 21 will effect additional counterclockwise rotation of the control shaft 428 to cause the upper tooth portion of the $F_2$ cam to be placed in abutment with the upper end wall 441 of the cam follower surface of the cutout 4406 and further counterclockwise rotation of the control shaft 428 will cause auxiliary rail 4405 to shift in a rearward direction until the $F_2$ cam is in its FIG. 22A position wherein the backside of lower tooth portion 4463 is received in lower locking portion 4413 of the outer cam follower surface of cutout 4406 and the lower corner portion 4415 is received in the lower notch-return portion 4417 of the $F_2$ cam. Similarly, downward movement of shift lever 484 to a neutral position of the shift lever as shown in FIG. 21 will cause the $F_2$ cam to shift the auxiliary rail 4405 back to its neutral FIG. 22C position due to the contact between notch-return portion 4417 and locking surface 4413.

$O_1$ cam 4464 which is positioned in cutout 4402 of output shift rail 4401 has a slight different configuration and is positioned in a differently configured cutout but operates in identical fashion as the $O_1$ cam in the first embodiment illustrated at FIG. 13.

In FIG. 21 the shift pattern of the shift control system 400 is illustrated. Neutral position 492 between the second and third speed ratios corresponds with the position of control shaft 428 in FIG. 20. When the handle (not shown) of shift lever 484 is shifted to the right as viewed in FIG. 21 to the neutral position between the fourth and fifth speed ratios, the control shaft moves one cam to the left than that viewed in FIG. 20. Similarly, when the handle of the shift lever is moved to neutral position 491 between the reverse and first speed ratios the control shaft moves one cam to the right from that viewed in FIG. 20.

As shown in FIG. 21 the second through fifth speeds may be considered to comprise the standard "H" shift pattern. The right end of control shaft 428 is provided with a bore 451 that receives light blockout spring 455 and associated parts to enable the operator to sense the additional first and reverse speed ratios in an identical fashion as the leftward adjacent pair of speed ratios is sensed in the first embodiment.

Except as noted all cams function as previously discussed with respect to the first embodiment. However, the shift rails are repositioned in the transmission and the cams are rearranged on the control shaft 428 to present the fourth embodiment five speed shift control system of the present invention. The selected cams are positioned in the cutouts of the respective shift rails to provide the speed ratios as follows:

| Speed Ratio | Auxiliary Rail 4405 | Input Aux. Shift Rail 407 | Output Shift Rail 4401 | Output Shift Rail 403 |
| --- | --- | --- | --- | --- |
| R-1 | F₂ Cam 482 | — | O₁ Cam 4464 | Interlock Member 4446 |
| 2-3 | — | O₂ Cam 4468 | Interlock Member 4438 | R₁ Cam 4436 |
| 4-5 | — | O₂ Cam 4472 | Interlocking Member 481 | F₁ Cam 4474 |

From the foregoing, it is believed that those familiar with the art will readily recognize and appreciate the novel concepts and features of the present invention. While the invention has been described in relation to only four embodiments, numerous variations, changes and substitutions of equivalence will present themselves to persons skilled in the art and may be made without necessarily departing from the scope and principles of this invention. As a result, the embodiments described herein are subject to various modifications, changes and the like, with the scope of this invention being determined solely by reference to the claims appended hereto.

What is claimed is:

1. A transmission having a plurality of speed ratios comprising:
   a housing;
   a shift lever pivotally connected with the housing, the shift lever having a lower end extending through the housing;
   a control shaft contained in the housing and operably associated with the shift lever, the control shaft being shiftable in opposed directions in response to pivotal movement of the shift lever, the control shaft having two ends, one of the ends having an internal bore;
   a bias assembly operably associated with the control shaft for resisting the shifting of the control shaft in a selected direction past a predetermined point, the bias assembly being mounted in the internal bore and projecting therefrom, whereby a first amount of resistance is provided to enable the operator to sense his position in the transmission shift pattern.

2. The transmission as claimed in claim 1 wherein the bias assembly includes a spring element and a collar element slidably mounted in the internal bore, an outwardly projecting element integrally connected to the collar element for movement therewith, a retaining element for limiting the extent of sliding movement of the collar element in the selected direction, the spring element spaced between the terminal end of the internal bore and the collar element whereby the spring element is compressed when the projection element encounters an obstruction.

3. The transmission as claimed in claim 1 further comprising a second bias assembly operably associated with the control shaft for resisting the shifting of the control shaft in the selected direction at a second predetermined point past the first mentioned predetermined point.

4. The transmission as claimed in claim 3 wherein the control shaft has two ends, one of the ends having an internal bore, the first mentioned bias assembly mounted in the internal bore and projecting therefrom, the second bias assembly including a spring member encompassed on the control shaft for sliding movement thereon.

5. The transmission as claimed in claim 4 wherein the bias assembly includes a spring element, a collar element slidably mounted in the internal bore, an outwardly projecting element integrally connected to the collar element for movement therewith, a retaining element operably associated with the control shaft for limiting the extent of sliding movement of the collar element in the selected direction, the spring element spaced between the terminal end of the internal bore and the collar element whereby the spring element is compressed when the projection element encounters an obstruction, the second bias assembly including a wall member relatively fixed on the shaft, a collar member slidably mounted on the shaft, a spring member spaced between the wall member and the collar member, a retaining member operably associated with the control shaft for limiting the extent of sliding movement in the selected direction of the collar member, whereby the spring member is compressed when the collar member encounters an obstruction.

* * * * *